(12) United States Patent
McGreevy et al.

(10) Patent No.: US 7,738,973 B2
(45) Date of Patent: Jun. 15, 2010

(54) DISTRIBUTED HISTORIAN ARCHITECTURE AND INTERFACES

(75) Inventors: Robert J. McGreevy, Oswego, IL (US); Deborah A. Sadowski, Pittsburgh, PA (US); Robert J. Herbst, Aurora, OH (US); Justin R. Hartman, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 246 days.

(21) Appl. No.: 11/536,369

(22) Filed: Sep. 28, 2006

(65) Prior Publication Data

US 2007/0112447 A1 May 17, 2007

Related U.S. Application Data

(60) Provisional application No. 60/736,432, filed on Nov. 14, 2005, provisional application No. 60/736,445, filed on Nov. 14, 2005.

(51) Int. Cl.
*G05B 15/00* (2006.01)
*G05B 11/01* (2006.01)
*G06F 17/40* (2006.01)

(52) U.S. Cl. .............................. 700/17; 700/83; 702/187
(58) Field of Classification Search ................... 700/17, 700/83; 702/187
See application file for complete search history.

(56) References Cited

U.S. PATENT DOCUMENTS

| | | | |
|---|---|---|---|
| 6,298,377 B1 | 10/2001 | Hartikainen et al. | |
| 6,505,247 B1 | 1/2003 | Steger et al. | |
| 6,701,324 B1 * | 3/2004 | Cochran et al. | 707/104.1 |
| 6,754,885 B1 * | 6/2004 | Dardinski et al. | 717/113 |
| 6,847,850 B2 | 1/2005 | Grumelart | |
| 6,886,047 B2 | 4/2005 | Leong et al. | |
| 6,975,913 B2 | 12/2005 | Kreidler et al. | |
| 7,027,880 B2 | 4/2006 | Izzo et al. | |
| 7,050,859 B1 | 5/2006 | Govindaraj et al. | |
| 7,050,937 B2 | 5/2006 | Lee | |
| 7,142,929 B2 | 11/2006 | Gallagher | |
| 7,231,403 B1 | 6/2007 | Howitt et al. | |
| 7,275,062 B2 | 9/2007 | Dietz | |
| 7,415,489 B2 | 8/2008 | Palapudi et al. | |
| 7,515,977 B2 | 4/2009 | Eryurek et al. | |

(Continued)

OTHER PUBLICATIONS

The ABB Group: Historian/Data Warehouse. Feb. 18, 2005. http://www.abb.com/cawp/GAD02181/C1256D71001E0037C1256D1D003F9D68.aspx?&v=36DE&e=us. Last accessed Nov. 10, 2006.

(Continued)

*Primary Examiner*—Ryan A Jarrett
(74) *Attorney, Agent, or Firm*—Turocy & Watson LLP; William R. Walbrun; John M. Miller

(57) ABSTRACT

A distributed historian framework is provided where historical data is collected in accordance with an organizational model of a hierarchical system that is distributed across various elements of an enterprise. A directory service operates with the organizational model to enable configuration of historian components within the organization and to enable data to be located within the organization. In one aspect, an industrial automation system is provided. The system includes at least one historian component to archive data within an organization. A common data model then exposes functionality and data of the organization to the historian component.

24 Claims, 27 Drawing Sheets

U.S. PATENT DOCUMENTS

| | | |
|---|---|---|
| 7,568,000 B2 | 7/2009 | Keyes et al. |
| 7,600,200 B2 | 10/2009 | K et al. |
| 7,617,289 B2 | 11/2009 | Srinivasan et al. |
| 7,627,385 B2 * | 12/2009 | McGreevy et al. ............ 700/20 |
| 2003/0041135 A1 | 2/2003 | Keyes et al. |
| 2004/0117393 A1 * | 6/2004 | DeMesa et al. ............. 707/100 |
| 2004/0117766 A1 * | 6/2004 | Mehta et al. ................ 717/121 |
| 2004/0128027 A1 | 7/2004 | Groll et al. |
| 2004/0153171 A1 | 8/2004 | Brandt et al. |
| 2005/0131729 A1 | 6/2005 | Melby et al. |
| 2005/0149363 A1 | 7/2005 | Loiterman et al. |
| 2005/0166082 A1 | 7/2005 | Williams et al. |
| 2006/0026672 A1 | 2/2006 | Braun |
| 2006/0240990 A1 | 10/2006 | Reich et al. |

OTHER PUBLICATIONS

Matrikon OPC: DDE Server for ABB Enterprise Historian. http://www.matrikonopc.com/drivers/details.aspx?drId=85&print=Y. Last accessed Nov. 10, 2006.

ABB Information Management: Information Management Software. Nov. 25, 2004. http://www.abb.ca/product/us/9AAC115783.aspx?country=US. Last accessed Nov. 10, 2006.

OA mailed Dec. 15, 2008 for U.S. Appl. No. 11/536,346, 19 pages.

OA date Jul. 7, 2009 for U.S. Appl. No. 11/536,346, 19 pages.

Office Action dated Dec. 30, 2009 for U.S. Appl. No. 11/536,346, 24 pages.

* cited by examiner

DISTRIBUTED HISTORIAN ARCHITECTURE AND INTERFACES

CROSS REFERENCE TO RELATED APPLICATIONS

This application claims the benefit of U.S. Provisional Patent Application Ser. No. 60/736,432, filed on Nov. 14, 2005, entitled "DISTRIBUTED HISTORIAN ARCHITECTURE" and U.S. Provisional Patent Application Ser. No. 60/736,445, filed on Nov. 14, 2005, entitled "DISTRIBUTED HISTORIAN ARCHITECTURE" the entirety of both of which are incorporated herein by reference.

TECHNICAL FIELD

The subject invention relates generally to industrial control systems and more particularly to providing an integrated and scalable architecture that provides a common data model for capturing historical data in an industrial controller environment.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company may have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a PC-Historian which is an industrial computer used to capture data from controllers. This includes a platform that provides high speed, time series, data storage and retrieval from multiple control processors. The PC-Historian communicates with controllers through a standard network interface. The PC-Historian allows archiving data from the controller to an Archive Engine which provides additional storage capabilities.

In general, conventional historian processors enable high-speed real-time data collection by communicating directly with the control processor over standard network interfaces. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

There are several disadvantages to existing data collection and storage solutions however. Namely, conventional PC-historians are not tightly integrated with standard control systems, reducing the overall performance and causing configuration and deployment to be more complex and costly. PC-Historians are also generally applied on the back-end of system design and are thus, loosely coupled or integrated within the framework of the control architecture. This leads to many inefficiencies for collecting data and ultimately identifying what data should or should not be captured. Other shortcomings include how these historians map and integrate into a larger enterprise. In one example, an enterprise may employ a common scheme that defines security for the underlying control components. Since current historian systems are applied outside the control system framework, these components at best can provide their own security implementation but cannot be integrated in the security framework with other similarly situated components or up the chain of higher level or enterprise control components.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A distributed and scalable framework is provided that enables data historian functionality to be efficiently incorporated at various levels of an enterprise. From lower control and sensing levels of a plant, to middle tier control programs and applications, up through enterprise levels that aggregate data from lower and middle levels various historian components are provided to facilitate data collection across an organizational hierarchy. The framework includes adherence to a common or plant data model that allows historian data components to expose its context to the other components of the enterprise while also being able to automatically recognize and collect relevant data for archival and system restoration purposes.

The framework allows historian components to be tied to an organizational model and addressing mode that enables data to be automatically and efficiently exchanged from various layers of an organization, across organizational boundaries, and/or exchanged between lower-level control entities to upper-tiers of the organization. In one aspect, a hierarchical model of an organization is distributed across control systems and other components of the organization such as business computers where components that collect historical data can automatically communicate and be easily integrated within the framework. The framework also includes a directory and location service to enable configuration of historian components and to allow automated integration at the various levels of the organization.

By tying into the data model and directory structure, various historian features are enabled. Such features include automatic configurations under a unified security scheme, where security changes can be propagated to historian components from other components in the system. Another feature includes the ability to mark or label control data for historian purposes such that historian components in the system can be alerted to the fact that respective marked data is significant for recording purposes. By limiting recording to marked data, system bandwidth can be conserved. Publish and subscribe features can be provided where data is recorded upon changes in a data structure as opposed to having historian components in continuous polling mode for data. This feature increases system bandwidth and storage capabilities.

Other features include alarms & events handling for historian components, single point client programming for historian components across an organization, and providing various services to collect and report historian data at differing levels of an organization. Various integration features allow components of an organization to collaborate to provide an overall scheme for historical data collection. This can include having lower level PLCs or even sensor components collecting data and sharing such data with higher levels of the organization. If one or more of the levels become burdened with the data collection process, historian functionality can be shifted between levels to more effectively employ system-wide resources in an efficient manner. For instance, communications between levels can allow sharing of data collection responsibilities between one or more levels of the enterprise from the very lowest levels through the higher levels of the organizational hierarchy.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A distributed historian framework is provided where historical data is collected in accordance with an organizational model of a hierarchical system that is distributed across various elements of an enterprise. The model allows data identified for historian purposes to be automatically collected and also allows historian functionality to be exposed and thus efficiently integrated with other elements of an organization. Such elements include representations of the system that are maintained on higher-level business servers and other representations that serve control elements of the system such as programmable logic controllers and/or other industrial control components (e.g., sensors, modules, and so forth). A directory service operates with the organizational model to enable configuration of historian components within the organization and to enable data to be located within the organization. Common organization functionality such as security services can be distributed to the historian components according to the data model and directory service. In one aspect, an industrial automation system is provided. The system includes at least one historian component to archive data within an organization. A common data model then exposes functionality and data of the organization to the historian component.

It is noted that as used in this application, terms such as "component," "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
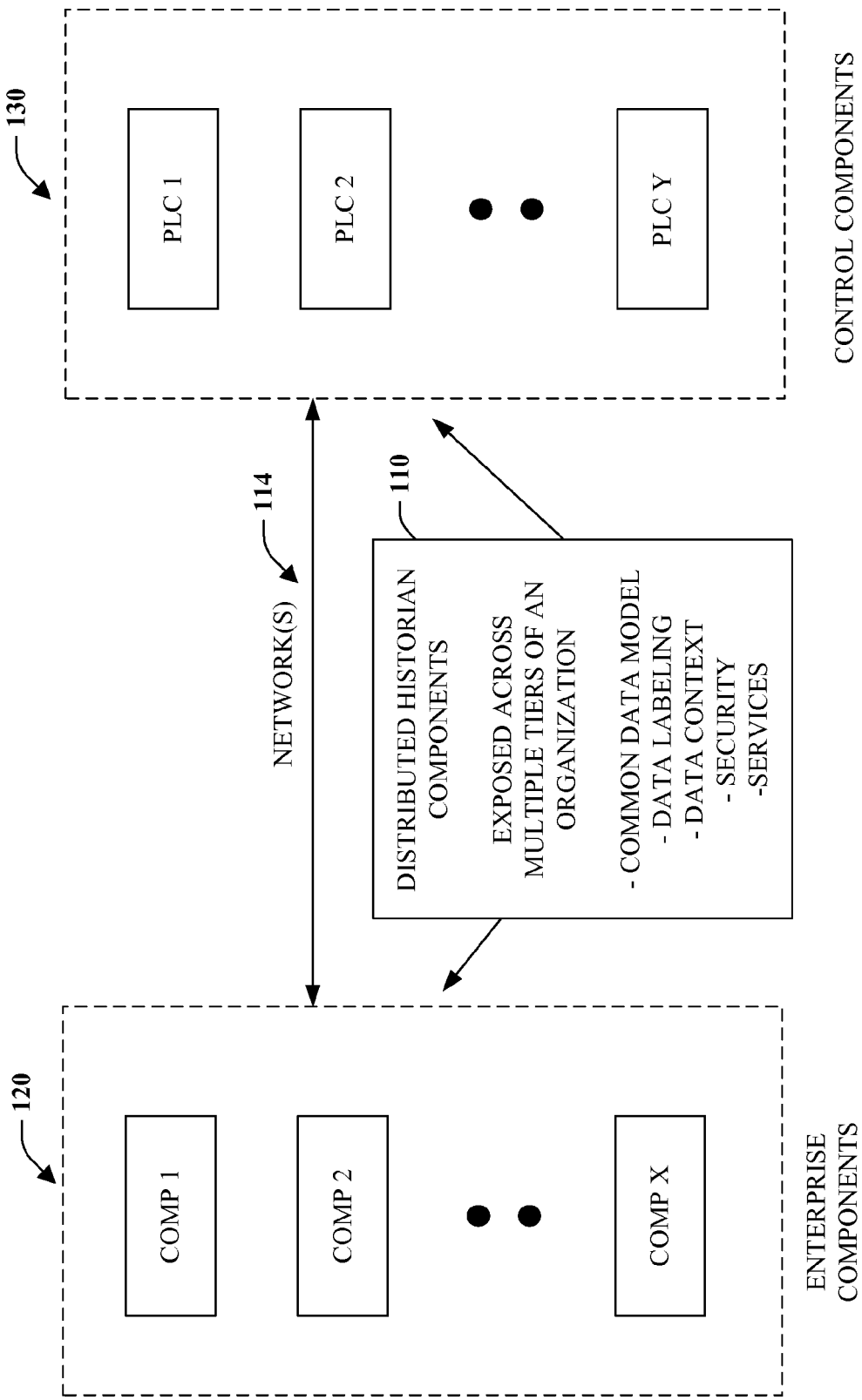
FIG. 1 is a schematic block diagram illustrating a historian component operating in a hierarchical organizational model.

Referring initially to FIG. 1, a system 100 illustrates historian components 110 operating in an organizational data model. The historian components 110 can be distributed across a network 114 to provide a collective or distributed database. As illustrated, an enterprise or organization 100 may have one or more computers or network components that communicate across the network 114 to one or more industrial control components 130 such as programmable logic controllers (PLCs) 130 or other factory components. Thus, the historian components 110 can be operated as a singular or collective entity while being viewed, managed and distributed across substantially all or portions of the enterprise 120 and/or PLC 130. For example, at the control levels 130, historians can be embedded within a PLC rack to collect data, whereas higher levels at 120 can be employed to aggregate data from lower levels. This may include higher level software components that communicate across the network 114 to collect data from lower level control components.

The system 100 enables combining organizational information such as an organizational or hierarchical data model which represents a common model of a plant that can be based in the S88 or S95 model, for example, and is distributed among computers of the enterprise 120 and industrial controllers 130, for example. The model can be viewed as an Organizational Data Model—a tree-like hierarchical and heterogeneous structure of organizational Units. For instance, respective Organizational Units may include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and AOI objects), programs, equipment phases, I/O devices, and other application related entities. These organizational units thus can form an application view of the user's system.

A typical system 100 can assign the upper levels of the hierarchy such as an Enterprise node and site to a computer system and the lower levels such as area, line, cell and machine could be contained in multiple industrial controllers each of which can include components which are members of one or more organization units such as area or area model. An organization unit such as area can contain components from one or more controllers. The historian component 110 can be situated at various levels of the enterprise 120 and/or control 130 and can be integrated therein and scaled according to system data collection needs. The organizational model enables historian components 110 to locate data of interest for collection purposes and to easily adapt and become integrated within the larger system 100.

Adaptability within the system 100 is facilitated by data having additional information such as metadata that identifies the purpose of the data. For instance, one form of data may identify itself as a control tag that has been marked or labeled via metadata to indicate its significance for data collection purposes. Another type of label or metadata may indicate security information that is being distributed throughout the system 100. Still yet other type of data may indicate that an alarm condition or an event has occurred within the system and thus, a respective historian component should capture such alarm or event. In general, the organizational model enables historian components 110 to receive functionality or data context from the system 100 and to expose its respective functionality to the system via the model. For example, context allows historian components to such auto configuration routines where one or more components of the historian architecture are automatically discovered and configured onto a respective system. In this manner, the historian components 110 can be automatically integrated within the system 100 which also facilitates scaling of the system as data conditions change.

In one example, such scaling can include the ability of one or more components of an organization to collaborate to provide an overall scheme for historical data collection. This can include having lower level PLCs or factory components collecting data and sharing such data with higher levels of the organization. If one or more of the levels become overloaded with the data collection process, historian functionality can be shifted between levels (upwards or downwards) to more effectively employ system-wide resources in an efficient manner. For instance, communications between levels can allow sharing of data collection responsibilities between one or more levels of the enterprise from the very lowest levels through the higher levels of the organizational hierarchy. Thus, in one example, the lowest level entity may have sufficient memory for data collection of desired historian or archived information. If such memory resources were to be consumed for some reason, messaging capabilities throughout the hierarchy could take over to distribute storage responsibilities from one layer to another via suitable network messages (wireless or wired) that communicate data from one level to another. As can be appreciated, tiers of an organization can collaborate in many combinations. Thus, a high level tier could collaborate with a low level tier or collaboration can take place between multiple tiers if desired such as between higher levels, intermediate levels, and lower levels of an organization.

Before proceeding, it is noted that the enterprise 120 can include various computer or network components such as servers, clients, communications modules, mobile computers, wireless components, and so forth which are capable of interacting across the network 114. Similarly, the term PLC as used herein can include functionality that can be shared across multiple components, systems, and or networks 114. For example, one or more PLCs 130 can communicate and cooperate with various network devices across the network 114. This can include substantially any type of control, communications module, computer, I/O device, sensor, Human Machine Interface (HMI)) that communicate via the network 114 which includes control, automation, and/or public networks. The PLC 130 can also communicate to and control various other devices such as Input/Output modules including Analog, Digital, Programmed/Intelligent I/O modules, other programmable controllers, communications modules, and the like.

The network 114 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In addition to various hardware and/or software components, various interfaces can be provided to manipulate the historian components 110 and organizational data model where various examples are illustrated in more detail below. This can include a Graphical User Interface (GUI) to interact with the model or other components of the hierarchy such as any type of application that sends, retrieves, processes, and/or manipulates factory or enterprise data, receives, displays, formats, and/or communicates data, and/or facilitates operation of the enterprise 120 and/or PLCs 130. For example, such interfaces can also be associated with an engine, server, client, editor tool or web browser although other type applications can be utilized.

The GUI can include a display having one or more display objects (not shown) for manipulating the model including such aspects as configurable icons, buttons, sliders, input boxes, selection options, menus, tabs and so forth having multiple configurable dimensions, shapes, colors, text, data and sounds to facilitate operations with the model. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI. It is noted that the organizational model facilitates a single point or client interface, where substantially all historian components 110 within the system 100 can be configured and/or operated. This is achieved since data to or from the historian components 110 is exposed and identifies its underlying function and can thus be manipulated from a common interface point or source.

Figure 2:
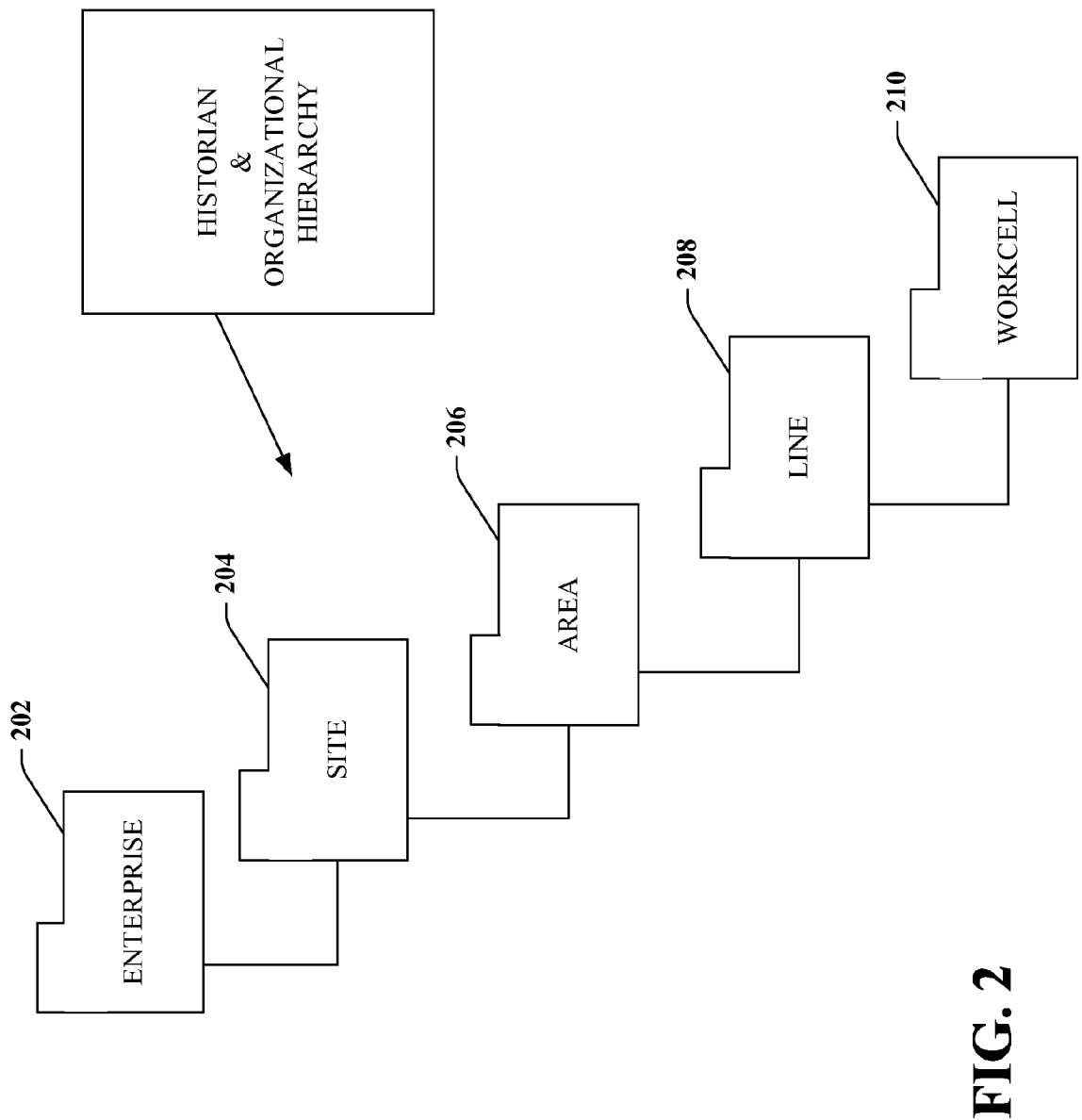
FIG. 2 is a diagram illustrating a historian component integrated with a hierarchical data structure.

Referring now to FIG. 2, a historian component 200 is illustrated in connection with an exemplary hierarchically structured data model. For example, the data model can facilitate nested structures, thereby mitigating deficiencies associated with data models that employ flat namespaces although flat namespaces can be employed as well. The example structure includes an enterprise level 202, where a particular enterprise can be represented within data structured in accordance with a hierarchical data model. Beneath the enterprise level 202 can be a site level 204, so that a particular factory (site) within an enterprise can be represented within a data packet. Beneath the site level 204 an area level 206 can exist, which specifies an area within the factory that relates to the data. A line level 208 can lie beneath the area level 206, wherein the line level 208 is indicative of a line associated with particular data. Beneath the line level 208 a work-cell level 210 can exist, thereby indicating a work-cell associated with the data. Utilizing a nested, hierarchical data model, historian components 200 can become more aware of data associated therewith. Furthermore, the hierarchy can be customized by an owner of such hierarchy. For instance, more granular objects/levels can be defined within the hierarchy.

Figure 3:
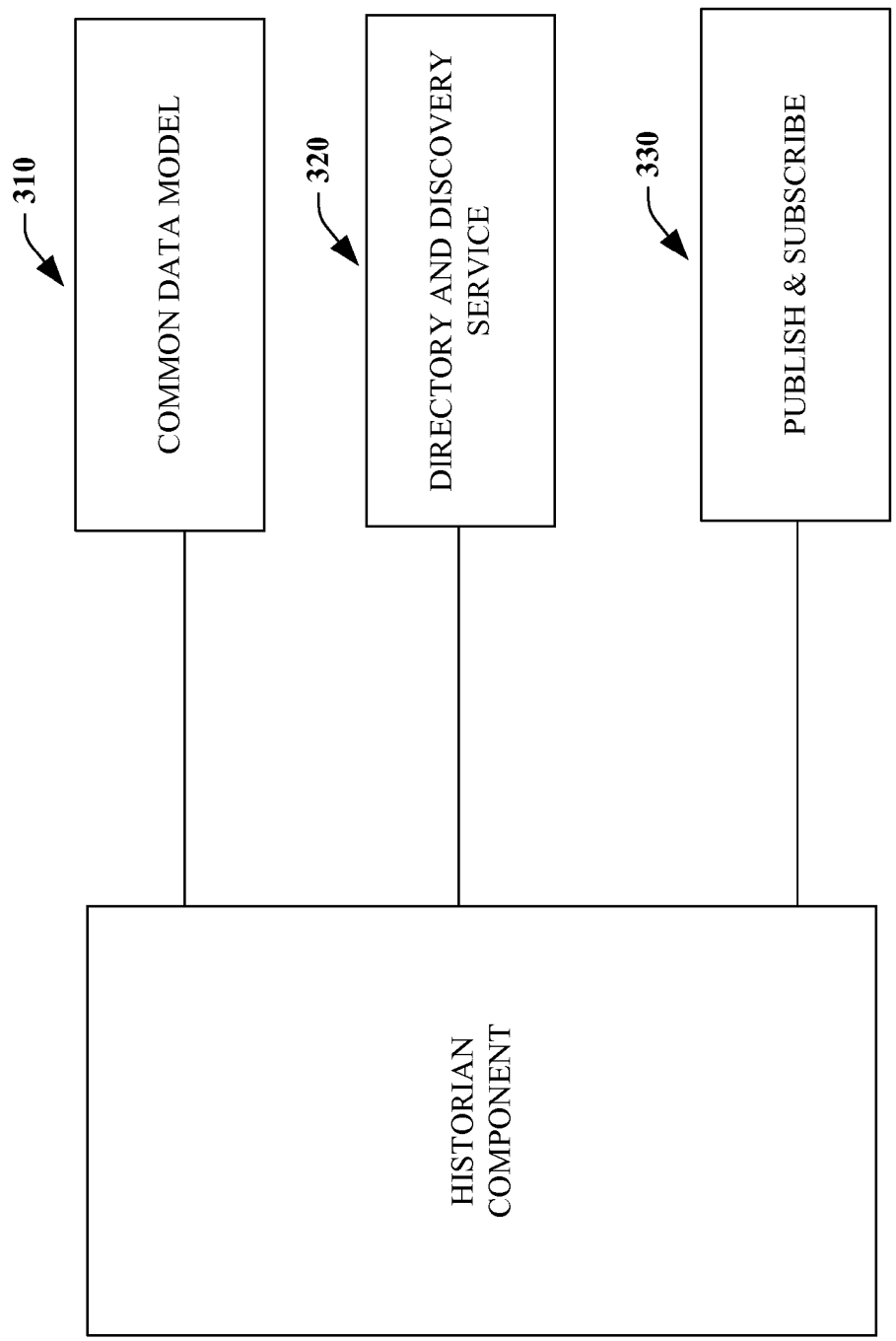
FIG. 3 is a diagram illustrating a historian component and data integration and scaling components.

Turning to FIG. 3, a historian component 300 and data integration and scaling components are illustrated. At 310, a common plant model is employed to enable the historian component 300 to determine data contexts in an automated manner. The model 310 allows data to be marked or labeled via metadata for example to both expose historian functionality to a system and/or to allow the historian component 300 to be automatically integrated within the system according to data that is exposed to the historian component. For example, one such labeling could be security related and could affect substantially all components in the system associated with the common model 310. For example, if a password were to change, such a change could be communicated to all components adapted to the common model 310. This is in contrast to conventional historians that require the historian security to be set outside the system and on an individual basis. As can be appreciated, security changes may not be propagated appropriately if a human is required to set security on a per unit basis and outside the system context that is adapted to change in unison.

At 320, a directory and discovery service is provided to enable the historian component 300 to locate other historian components in the system and to receive/expose historian data to other system components. This can include a network directory that determines physical addresses from logical names and visa versa. Such directory and discovery is described in more detail below. At 330, publish and subscribe functionality can be provided with the historian component 300. This allows data to be reported and generated based upon the change in the data itself. Such functionality enhances the data collection efficiency of the system. For example, conventional historian systems operate in a continuous polling mode for data which can lead to a massive amount of redundant information being stored from non-changing values. In contrast, the publish and subscribe component 330 allows data to be published or generated when a change in the data has been detected. Thus, the historian components can subscribe to such change events and thus only record data when a change has occurred which reduces the amount of data to be stored.

Figure 4:
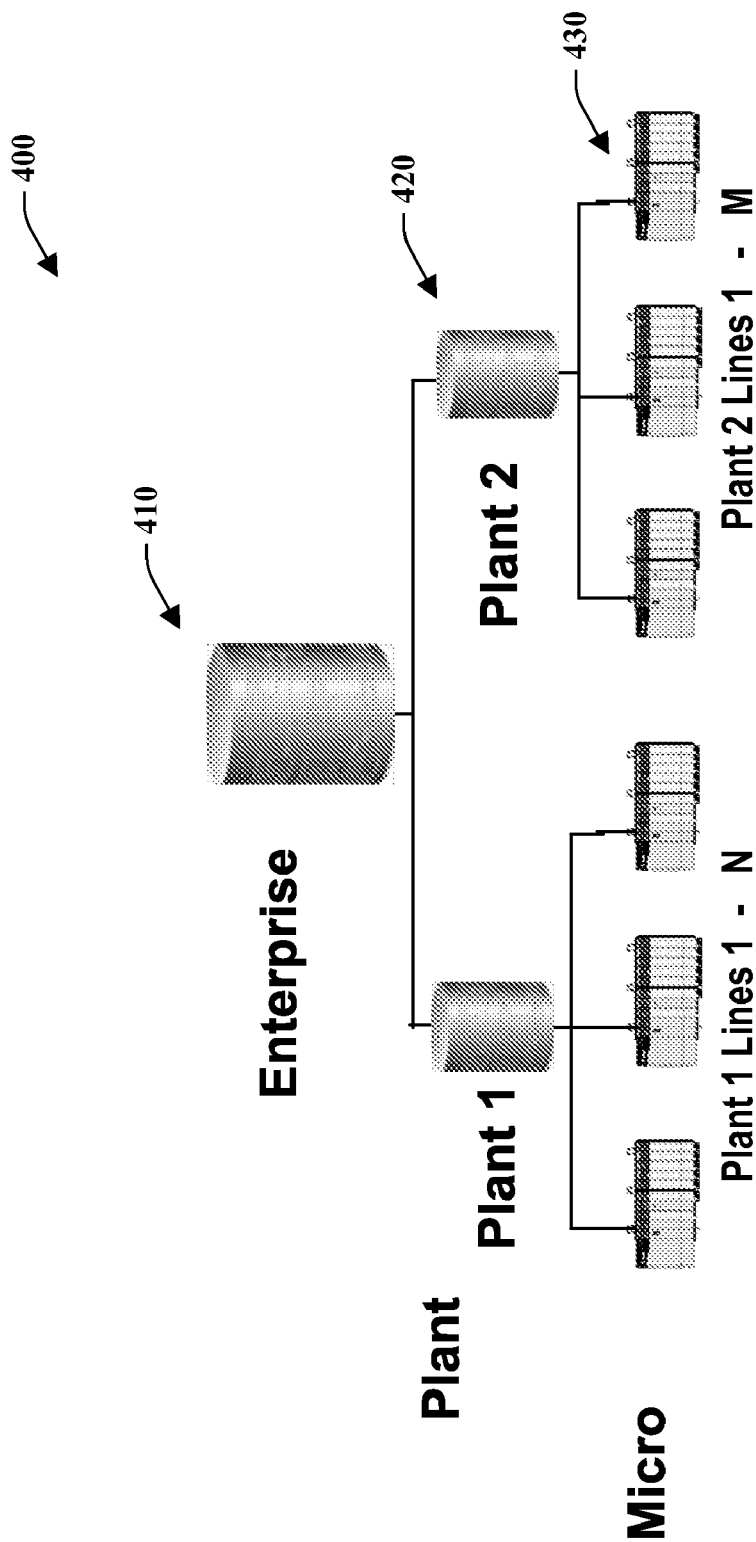
FIG. 4 is a diagram illustrating a multi-tiered historian system.

FIG. 4 illustrates a multi-tiered and distributed historian system 400. The system 400 illustrates three example tiers of a historian system however it is to be appreciated that more or less than three tiers can be provided. At 410, the highest data collection tier is illustrated and can be referred to as the enterprise tier. This tier aggregates data collected from lower level tiers such as from a plant tier 420 and a micro or embedded tier 430. As illustrated, the tiers 410 and 420 can include archival or permanent storage capabilities. In the system 400, data is collected from 2 plants at the tier 420 from a plurality of historian modules at tier 430. It is to be appreciated that data can be collected from more than two plants at 420 and 430. The following will now describe one or more of the features for the enterprise tier 410, the plant tier 420, and the micro tier 430.

In general, the system 400 can be viewed as a Distributed Historian that spans machines, plants, and enterprises. At 430, the micro historian collects data at the rack level and is coupled to Common Plant Data Structure described above. This can include collecting process & discrete data, alarms & events in a single archive if desired. Other aspects include auto-discovery of data and context from controllers in local chassis including store/forward data capabilities from local buffers. Data can be collected without polling, having a low communications bandwidth. The plant level 420 aggregates data from Micro or rack-embedded Historians and/or other data sources (e.g., Live Data source). This can include plant-level querying, analytics, reporting while efficiently storing, retrieving, and managing large amounts of data. This level can also auto-discover data and data model context from Micro Historians at 430. Other features of the system 400 include analysis components, mathematical calculators, components for interaction with report elements, embeddable presentation components, replication of configuration, storage, archiving, data compression, summarization/filtering, security, and scalability.

Figure 5:
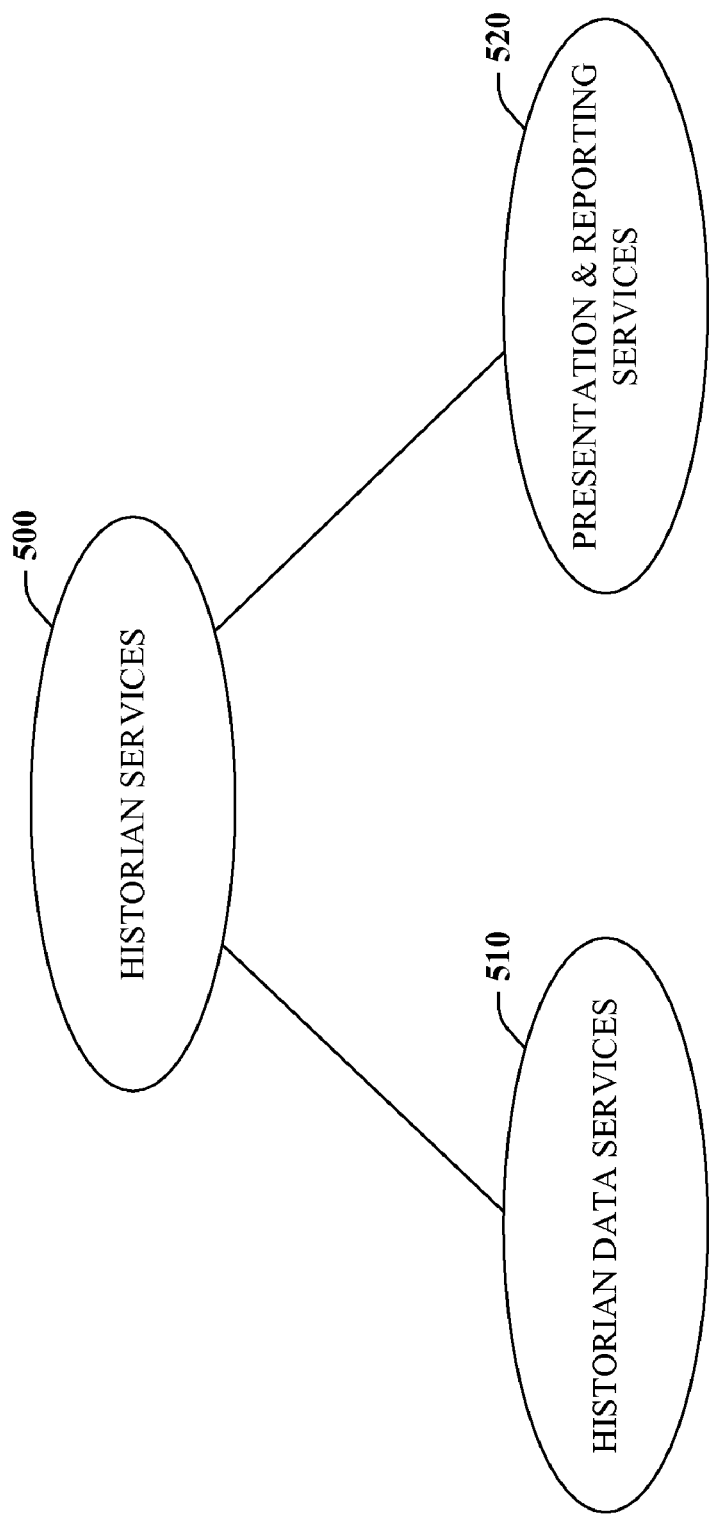
FIG. 5 is a diagram illustrating historian services.

FIG. 5 illustrates historian services 500 which can include historian data services 510 and presentation and reporting services 520. Historian Data Services 510 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 520 (PRS) can supply generic, customizable services for collating and presenting data in a common plant model-defined context. This can include access to stored data, analysis/calculators and query mechanisms, and embeddable, interactive presentation components (e.g., text, charts, SPC). The service 530 can generate reports with various means of presentation/distribution (e.g., web, email) having export capabilities to standard formats (e.g., XML, Excel).

Figure 6:
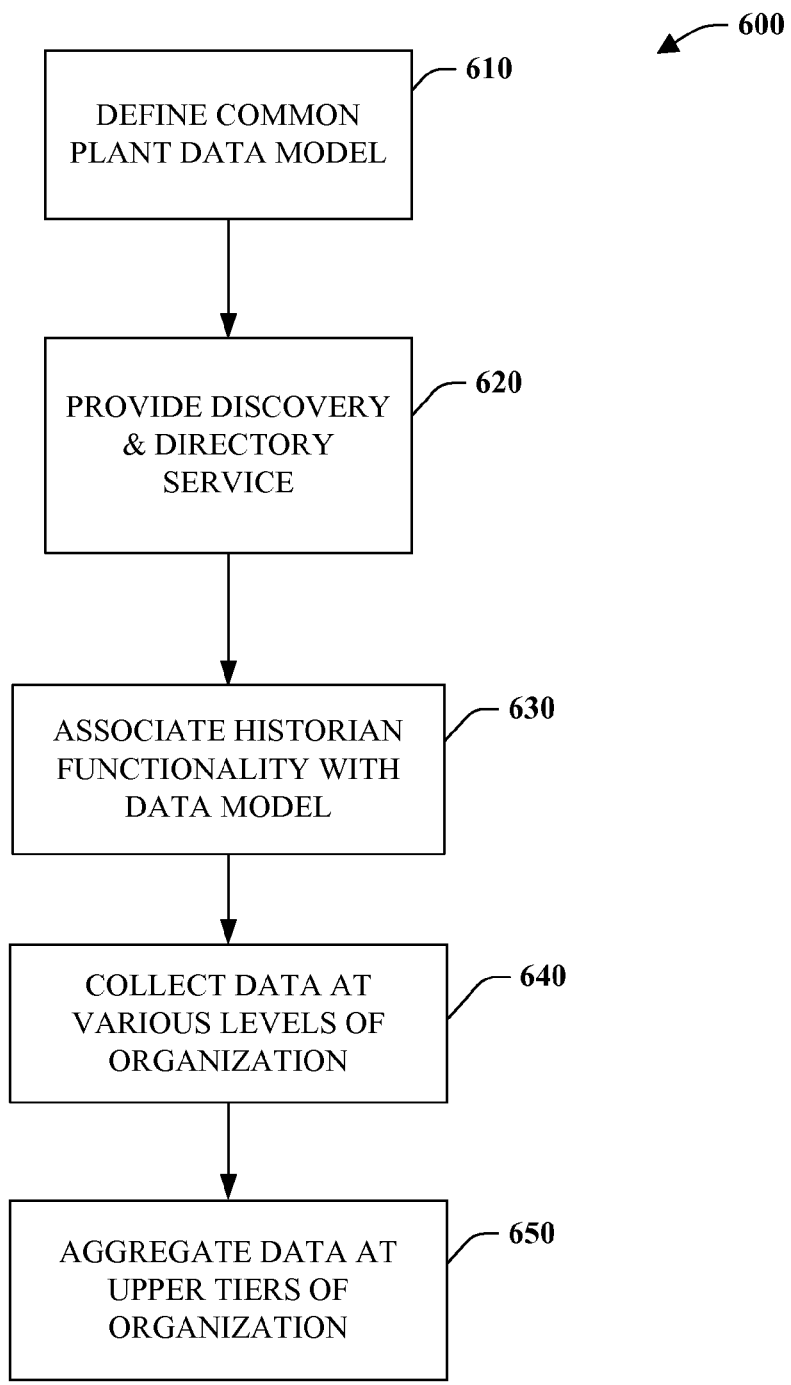
FIG. 6 is a flow diagram illustrating a distributed historian process.

FIG. 6 illustrates a distributed historian process 600 for collecting and storing data. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 610, a common organizational or plant data model is defined. As noted above, such models include the ability to describe the functionality of data in a system such as can be provided by metadata for example. At 620, a directory and discovery service is defined that enables locating components that employ the plant data model of 610. This can include employing a directory to determine a location of the source or destination for a particular historian data structure. At 630, historian functionality is associated with the common data structure of 610. This can include the ability to mark data within the controller that such data is to be collected by a historian component. Similarly, data can be exposed to historian components according to its metadata or other determined data context. At 640, historian data is collected across various levels of an organization according to the plant data model and via the directory service. At 650, services can be provided for aggregating data at middle or upper tiers of an organization from lower levels that report data such as from embedded historian components operating in a control system.

Figure 7:
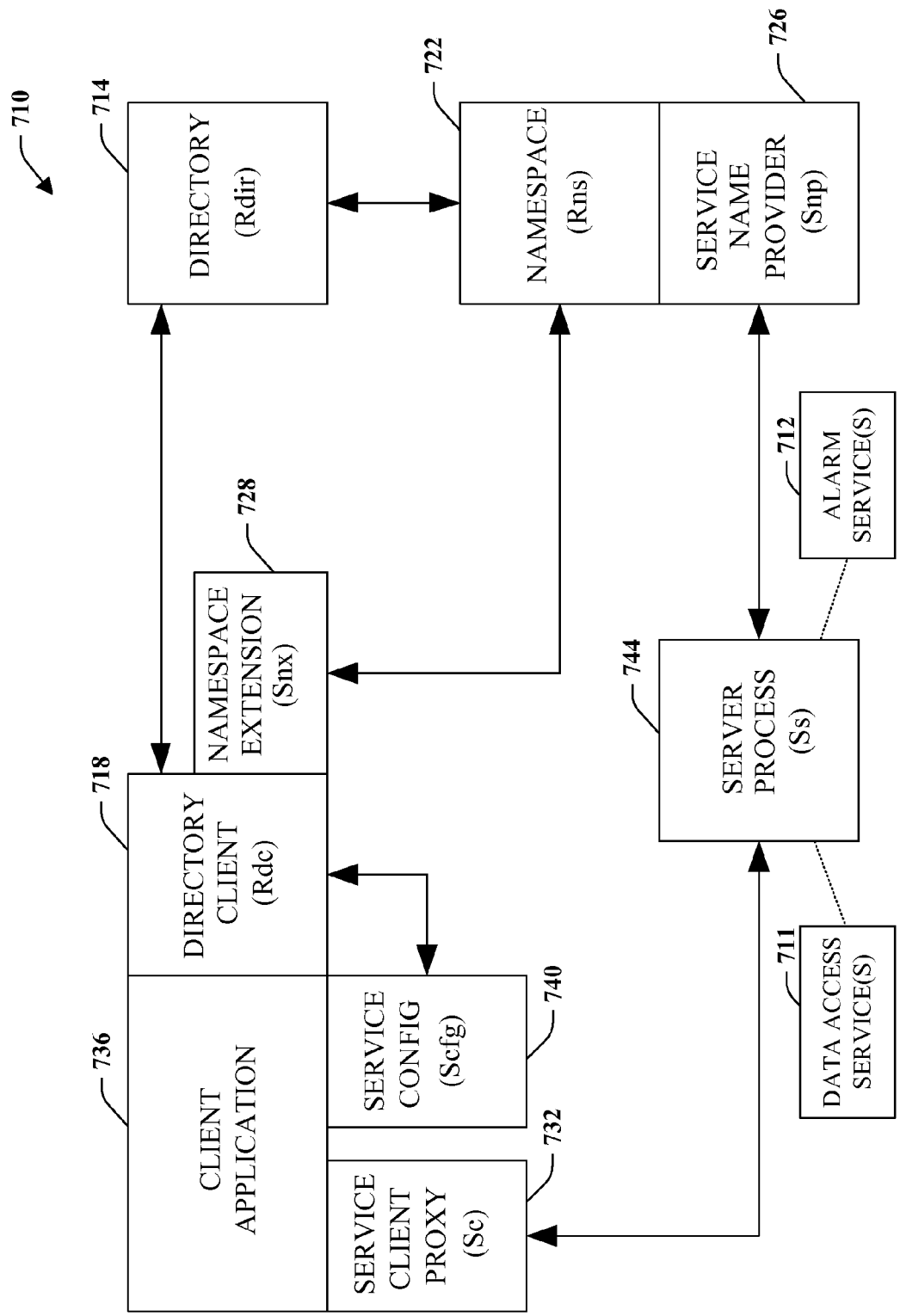
FIG. 7 is a diagram illustrating a directory and discovery service for interacting with historian components.

Referring to FIG. 7, a schematic block diagram illustrates a service architecture 710 that provides data access services 711 and alarm services 712. The service architecture 710 provides an industrial automation model and environment, wherein remote/disparate client and server automation components can interact and cooperate to control an industrial process. The data access services 711 can be associated with a server process on or associated with an industrial controller and facilitate data being sent to and/or received from the controller. The alarm services 712 facilitate monitoring and reporting of data values that operate within specified ranges in accordance with the service architecture 710. It is noted that nomenclature Rxx represents service architecture elements, whereas Sxx represents components specific to a service. It is also noted that described component interactions of adjoining components can reside in similar or shared processes. In addition, change notification and redundancy management components can be provided which are not shown.

The service architecture includes a directory 714 (RDIR) that provides a persistent store of "globally interesting" or relevant information for one or more control components. The directory 14 includes "Tier" Directory objects which are described below and can include Applications, Areas, and Directory Entries, for example. The scope of the directory 714 may be local to a machine or global to a network, for example. A directory client (RDC) 718 (e.g., Active Directory Service Interface (ADSI)) interacts with the directory 714 to provide support for access to directory content. The directory client 718 can include service management interfaces for service binding via directory entries and host basic service and namespace extension components.

A namespace server 722 (RNS) is provided that aggregates service item names in areas to provide tier two or higher service item namespaces. The namespace server 722 generally expects server-specific components implementing a name provider interface and resolves service item names into server connection data. A name provider 726 (SNP) extracts service item names from supporting server processes and exposes internal structure of tier service item names. A namespace extension 728 (SNX) exposes service item names via ADSI or other interface and can act as a bridge between tier namespace components.

The service architecture 710 also includes a service client proxy 732 (SC) that provides client-side Application Program Interface (API). In addition, the client proxy 732 can manage multiple servers on behalf of a client application 736. A service configuration 740 (SCFG) facilitates creating and editing directory areas and entries to expose services and to define servers. A server process 744 (SS) supports service behavior and exposes the behavior to one or more clients 736 via service-specific interfaces and transport mechanisms accessed via the service architecture 710. Thus, the service architecture 710 incorporates multiple perspectives in a client and server environment including logical, physical, and behavioral aspects. These aspects can be permutations of access, computer and service dimensions of the namespace, for example.

Figure 8:
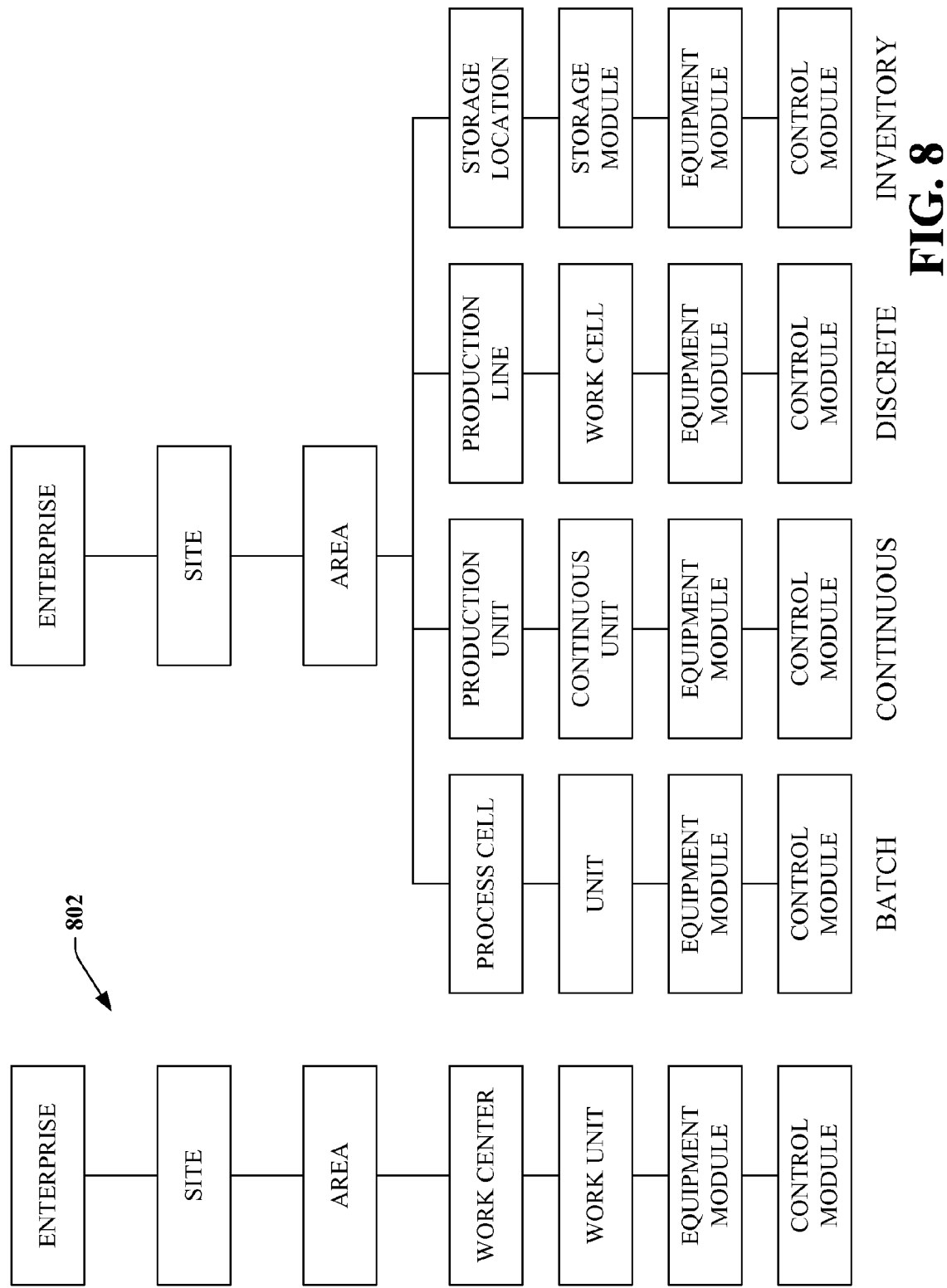
FIG. 8 illustrates exemplary hierarchies that can be utilized in connection with the hierarchically structured data model.

Now turning to FIG. 8, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 800 illustrates a representation of equipment within a plant given disparate processes. For instance, a hierarchy in accordance with a batch process can include a representation of an enterprise, site, area, process cell, unit, equipment module, and control module. In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 802 can be utilized that represents each of the aforementioned hierarchical representations. The hierarchy 802 can include representations of an enterprise, a site, an area, a work center, a work unit, an equipment module, and a control module. Thus, a common representation can be generated that adequately represents the hierarchy 800. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 800). Metadata can be employed to enable display of such data in accordance with known, conventional usage of such data. Thus, implementation of a schema in accordance with the hierarchy 802 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 802 (or similar hierarchy) within a controller.

Figure 9:
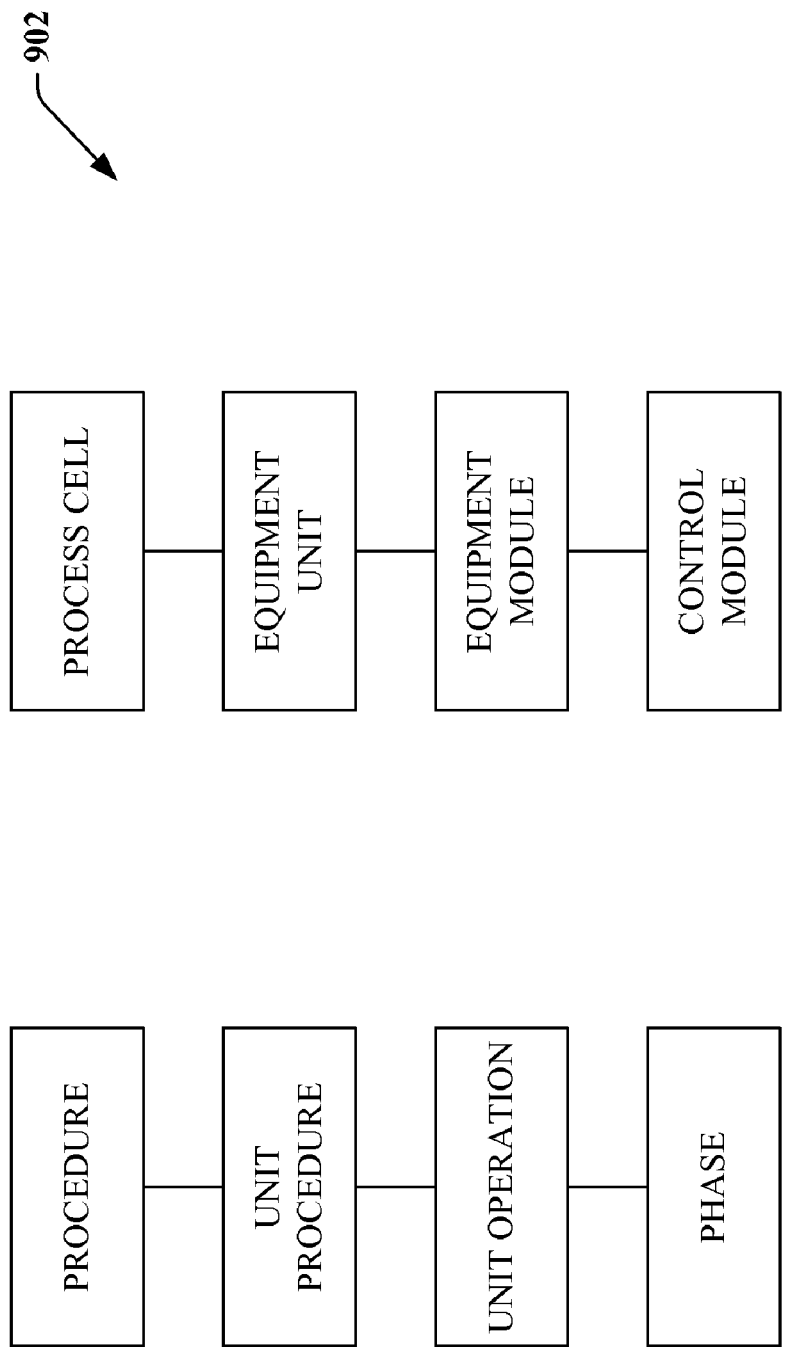
FIG. 9 illustrates exemplary hierarchies that can be utilized in connection with the hierarchically structured data model.

Now referring to FIG. 9, standard hierarchies that can be utilized to represent procedures and equipment are illustrated. In particular, a hierarchy 900 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, and pausing a motor, opening and closing a valve, and the like. A hierarchy 902 relating to a representation of equipment in, for example, a batch process is displayed adjacent to the hierarchy 900.

Figure 10:
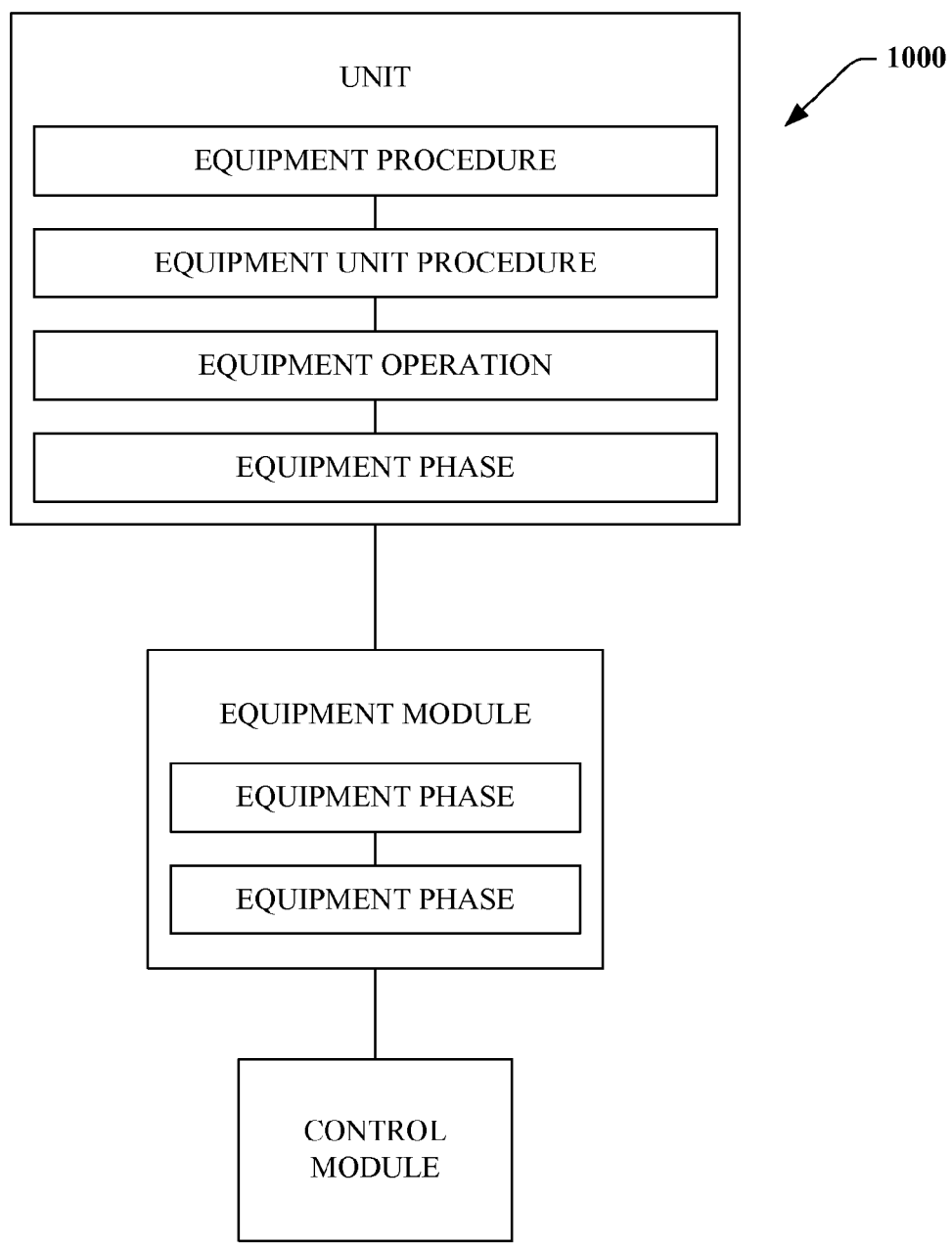
FIG. 10 illustrates an exemplary combination of hierarchies.
Figure 11:
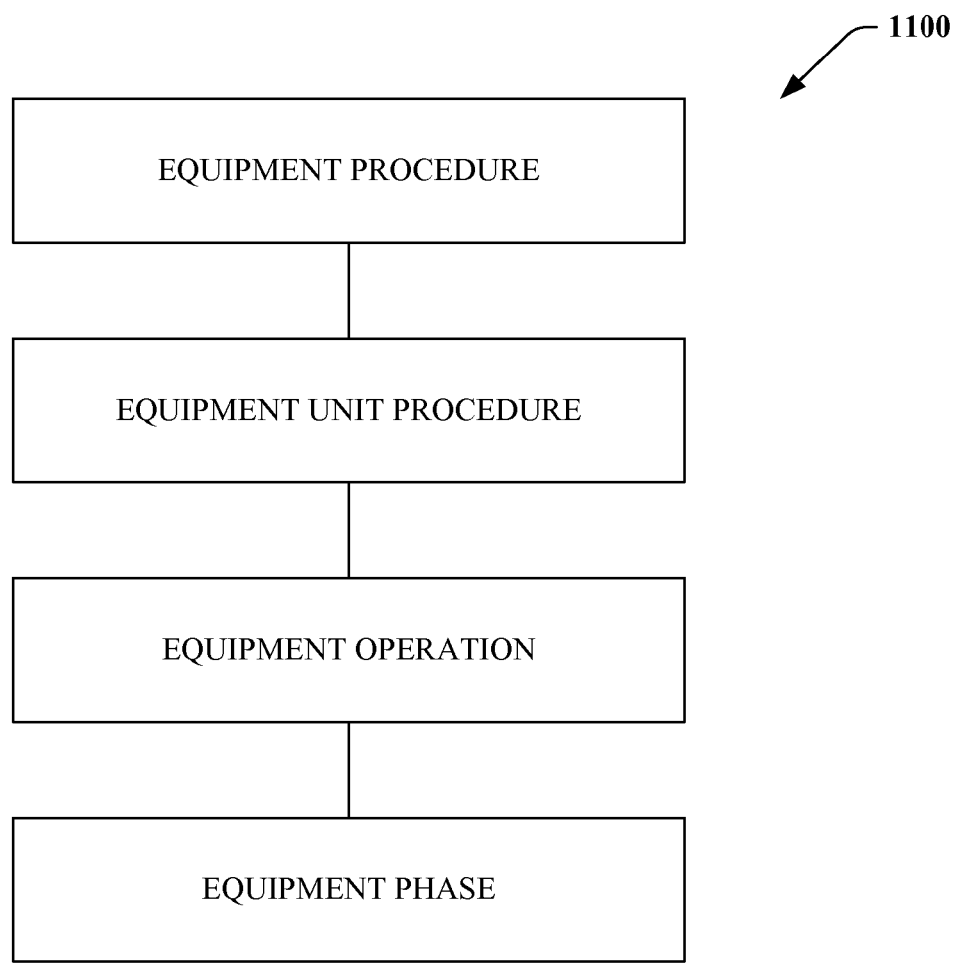
FIG. 11 illustrates an exemplary combination of hierarchies.

Now turning to FIG. 10, a hierarchy 1000 that represents one possible integration of the example hierarchies 900 and 902 (FIG. 9). A unit (such as a work unit described in FIG. 8) can be associated with an equipment procedure, an equipment unit procedure, an equipment operation, and an equipment phase). Thus, the procedures, operation, and phase can be associated with a particular work unit. An equipment module can be associated with one or more equipment phases, and can be above a control module in the hierarchy. Referring Briefly to FIG. 11, a hierarchy 1100 that can be utilized in connection with equipment control is illustrated. The hierarchy is substantially similar to that described within the unit portion of the equipment unit. As stated above, the hierarchies illustrated in FIGS. 8-11 can be based upon a standard, such as ISA 88, ISA 95, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 8-11 can be existent within a controller, together with state machines that enable creation of such objects.

Figure 12:
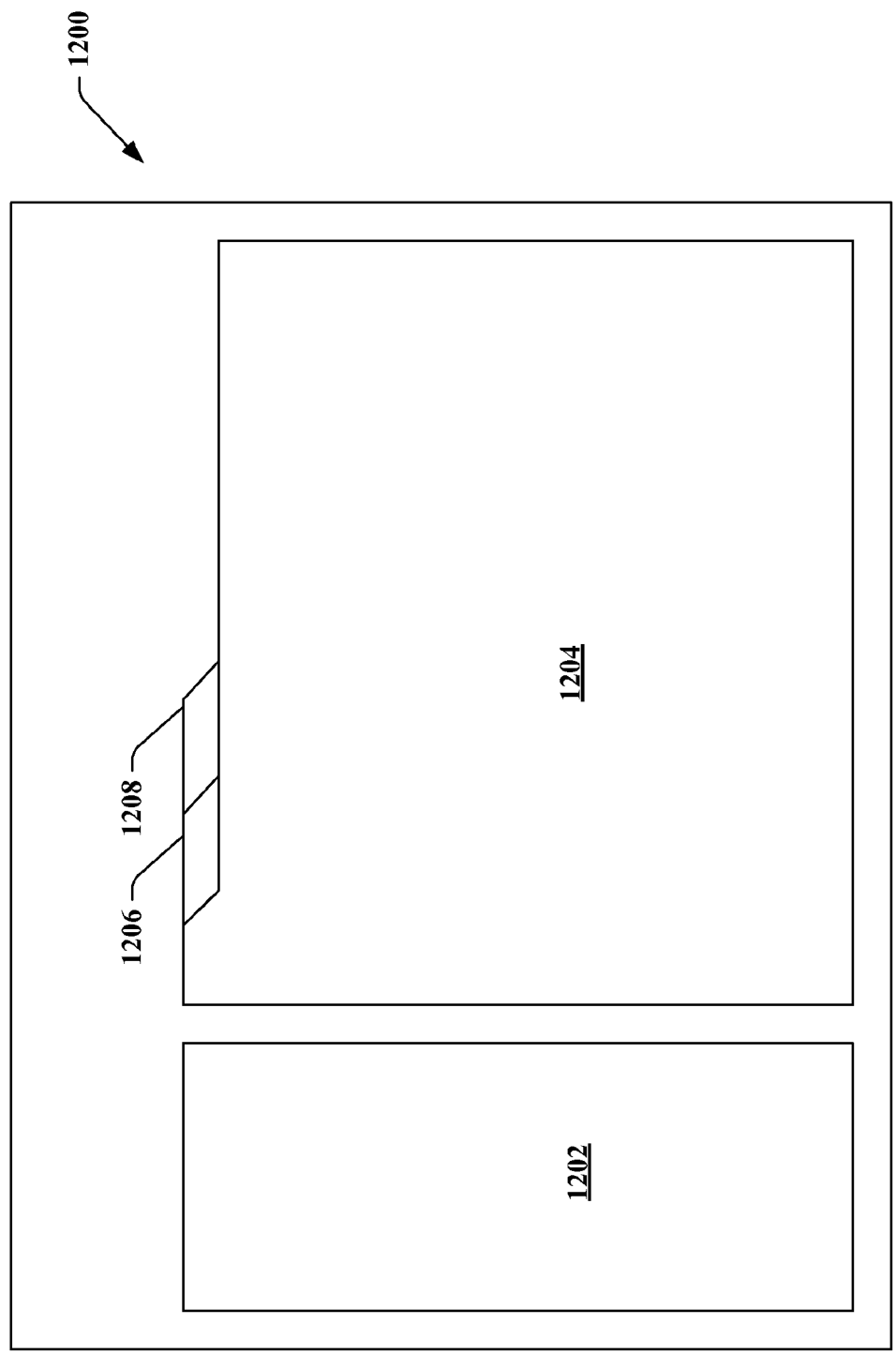
FIG. 12 is an exemplary graphical user interface that can be employed in connection with the historian component.

Now referring to FIG. 12, an exemplary graphical user interface 1200 that can be employed in connection with the systems and methods described above is illustrated. For example, the interface 1200 can be browser-based and accessible by way of any suitable network, thereby enabling remote access to functionality associated with the interface 1200 as well as a short learning curve for usability of functionality enabled through the interface. The exemplary interface 1200 can include a first field 1202 that may comprise a plurality of selectable and/or expandable entities. For instance, the first field 1202 can include folders that are expanded upon selection, and contents of the folders are logically related to the selected folder. A second field 1204 can include data that relates to a selected entity as well as further options associated with such entity. In one example, the first field 1202 can include a folder that relates to data collection plans, and expansion of such folder can reveal an icon that relates to an equipment model. Upon selection of the icon, the second field 1204 can illustrate a hierarchical view of an equipment model, as well as an option to add a new control module and/or a new data point. The second field 1204 can also include a plurality of tabs 1206-1208, wherein selection of one of such tabs enables provision of plant-related data and/or options to a user not found within a different tab. These tabs can be labeled so that a user can easily infer content of a display associated with the tabs.

In another particular example, a folder relating to data collection plans can be expanded to reveal an icon that relates to existing data collection plans. Upon selection of the icon, the second field 1204 can include a name of one or more data collection plans, a description relating thereto, as well as data points and collection rates associated therewith. For instance, radio buttons or the like can be employed to determine whether certain data points are to be associated with a collection, and associated fields can display editable frequency of collection. A button can be included within the second field 1204 that enables the data collection plan to be saved, and a summary of such plan can be provided to a user in the second field 1204. Selection of one of the tabs 1206-1208 can display different options, such as a high-level overview of each data collection plan, an opportunity to create a new data collection plan, etc.

In still another example, the first field 1202 can include a diagnostics folder, icon, or the like, and selection of such icon can cause presentation of related icons to be provided. On such related icon may be an auditing icon, wherein selection of the auditing icon may cause a listing of audits and alerts to be provided within the second field 1204. These audits and/or alerts can be selectable, wherein additional information is provided upon selection of such audits and alerts. In yet another example, the first field 1202 can include a selectable icon relating to reports, wherein the reports icon can be expanded to provide a plurality of selectable icons, such as a time series icon, a histogram icon, an alarm counts icon, and various other related icons. Upon selection of the time-series icon, for example, the second field 1204 can include a graphical analysis of time-series data, wherein visual characteristics of the graph can be altered per user request. Further, the second field 1204 can include a plurality of time series tools, such as when start and stop time-stamping.

In yet another example, the graphical user interface 1200 can display data collection data relating to an entirety of a plant, to a particular type of process, and the like. For instance, the first field 1202 can include an entity entitled "batch operations", beneath which are a plurality of selectable links or icons, which can relate to data relating to batch processes, such as process variables, equipment parameters, batch comparisons, and the like. Particular processes can also be provided, wherein the processes can be associated with entities such as process variables, downtime, alarms, and the like. The second field 1204 can include a data collection overview that can provide a high-level analysis to a user. This can be displayed upon logging into the interface 1200, for example.

At least one selectable entity within the first field 1202 can relate to configuration of a historian application, such as data collection. Upon selection of the entity, the second field 1204 can display a connection summary, such as whether a historian application is currently connected to a process, duration of the connection, number of tags or data points associated with the historian application, values collected per minute, etc. Similarly, upon selection of particular entities within the first field 1202, a second field can illustrate graphical depictions of alarm sequence, mean time between failure, faults associated with particular shifts, an alarm summary, and any other suitable data. The graphical depictions may be selectable, thereby enabling a user to "zoom in" on a particular portion of the graphical depiction. Furthermore, a text field can be provided upon hovering over particular portions of a graphical depiction with a pointer.

While particular examples have been provided above, it is understood that content selectable and/or displayed within the user interface 1200 may vary depending on desired application or context. Furthermore, orientation of the fields 1202 and 1204 may be altered to provide a user with a highly viewable and usable interface. Other fields may also be combined with the fields 1202 and 1204 to render the interface 1200 easily employable.

Various example user interface screens are now shown that represent interfaces that can be deployed at different levels of an organization. FIGS. 13-18 relate to example lower tier or micro historian interfaces, FIGS. 19-25 relate to example middle tier or plant historian interfaces, and FIGS. 26 and 27 relate to example upper tier or enterprise historian interfaces. It is to be appreciated that FIGS. 13-27 are but one possible example of interfaces that interact with the historian architecture described herein and that various other interfaces are possible. It is noted that aspects depicted in FIGS. 13-27 can include web based deployment and delivery. In the case of the Micro Historian, an on-board or embedded micro web server can be included, serving up various pages depicted in the FIGS. 13-27. Further, the configuration associated with FIGS. 13 and 14 can be "self-discovered" from control programs and not necessarily configured by the end user. In other words, configurations can be manually configured through the user interfaces shown or they can be auto-discovered and viewed.

Figure 13:
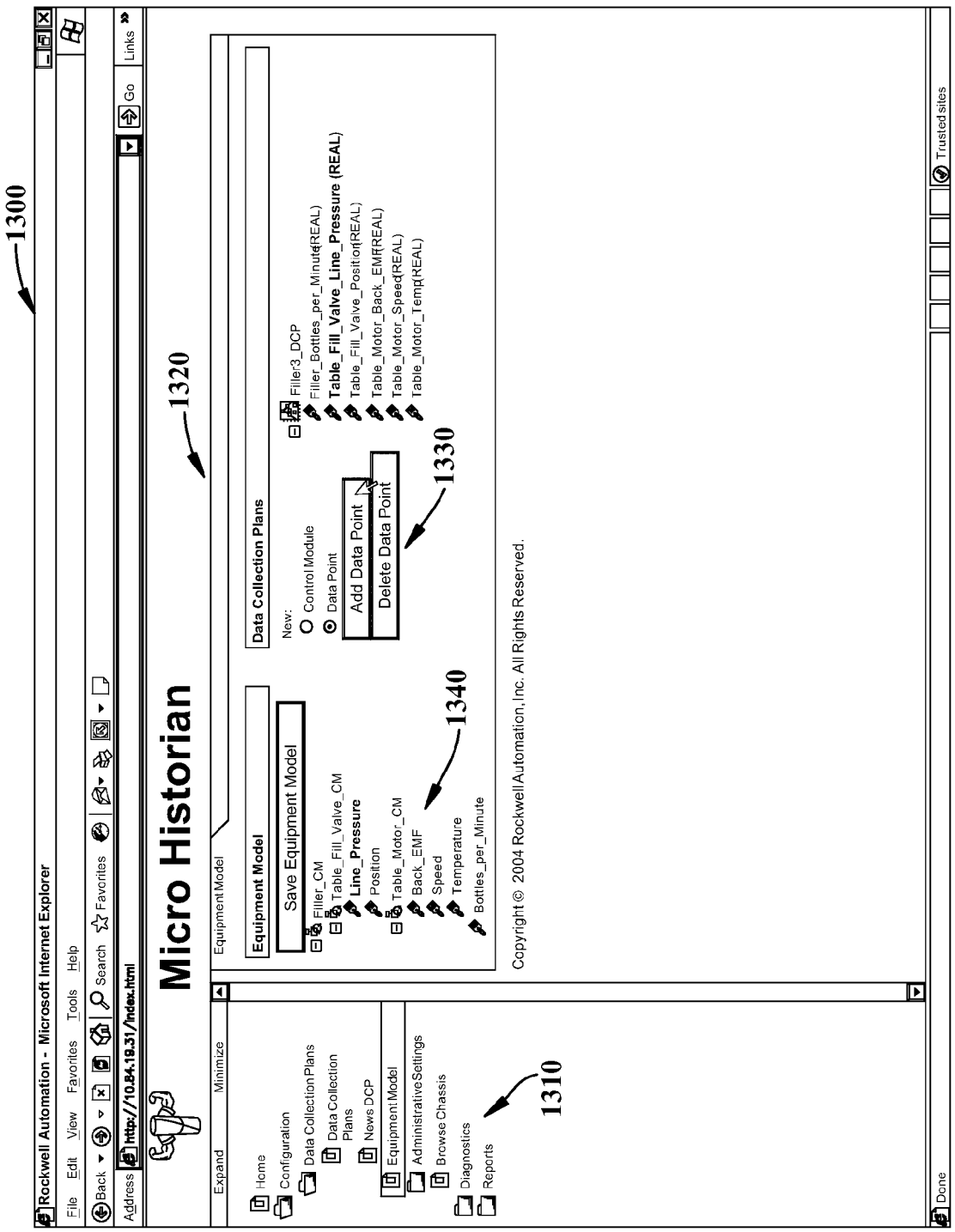
FIGS. 13-18 illustrate example micro or lower tier historian interfaces.

FIG. 13 illustrates an Equipment Model & Data-point Mapping interface 1300. At 1310 on the left of interface 1300, objects are provided for configuration, data collection plans a selection for the equipment model which is displayed at the right of interface 1300, administrative settings, chassis configurations, diagnostics, and report features. At the right at 1320, selections are provided for defining a control module or a data collection point and whether to add or delete a data point at 1330. Objects in the equipment modal are illustrated as including such examples as valves, motors, position equipment, motor variables, assembly line variables, and so forth.

Figure 14:
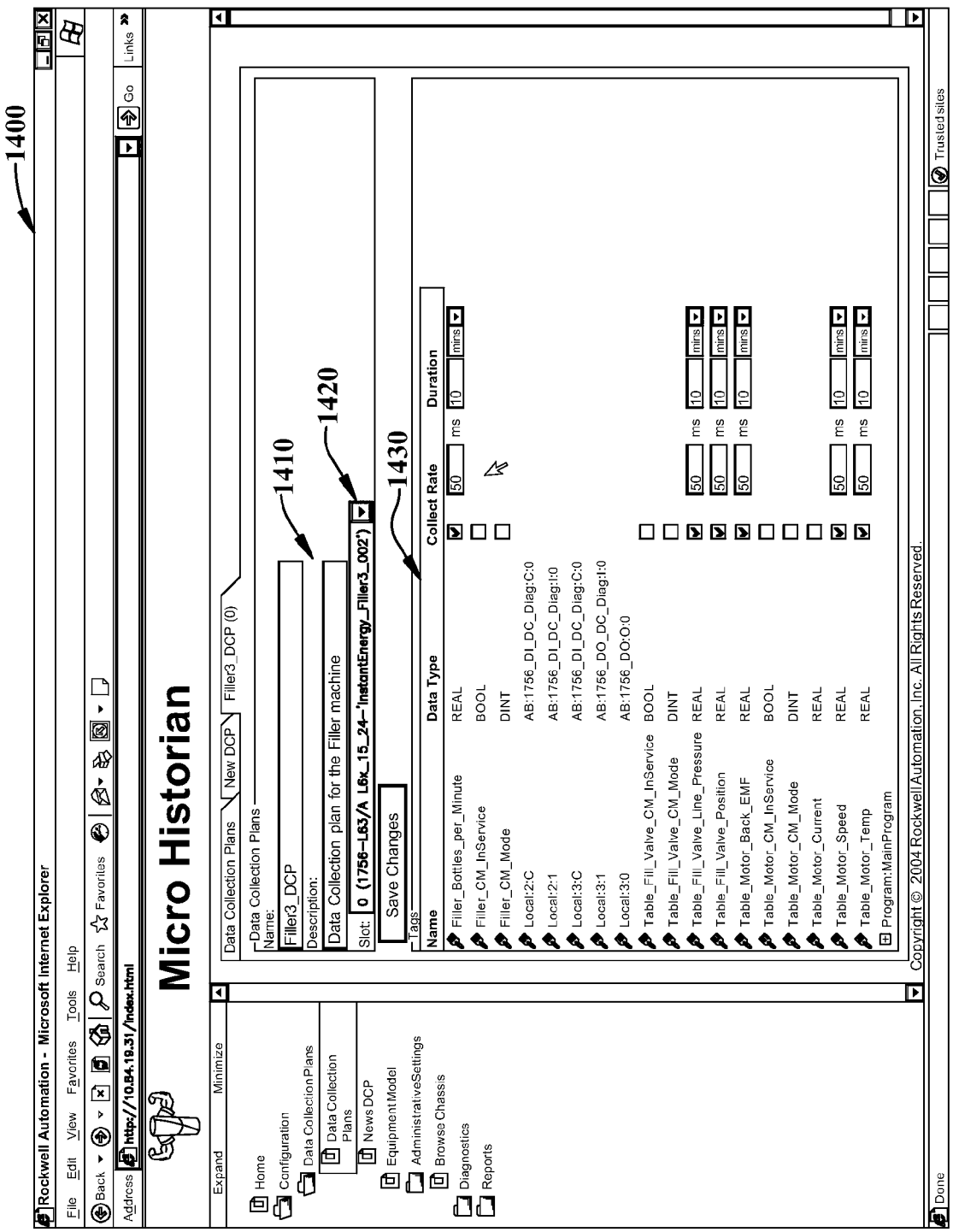

FIG. 14 illustrates an example data collection and configuration screen 1400. At 1410, fields are provided to identify machine or equipment names and the respective slot address at 1420 identifying where the historian data is received from. At 1430, data tag names are identified along with corresponding data types, collection rates (e.g., 50 ms), and collection duration which identifies how long to capture the respective data (e.g., 10 minutes). Thus, a micro historian can reside in a rack and collect data within the rack it resides, from another rack at the same level, and/or from other tiers of the enterprise if specified.

Figure 15:
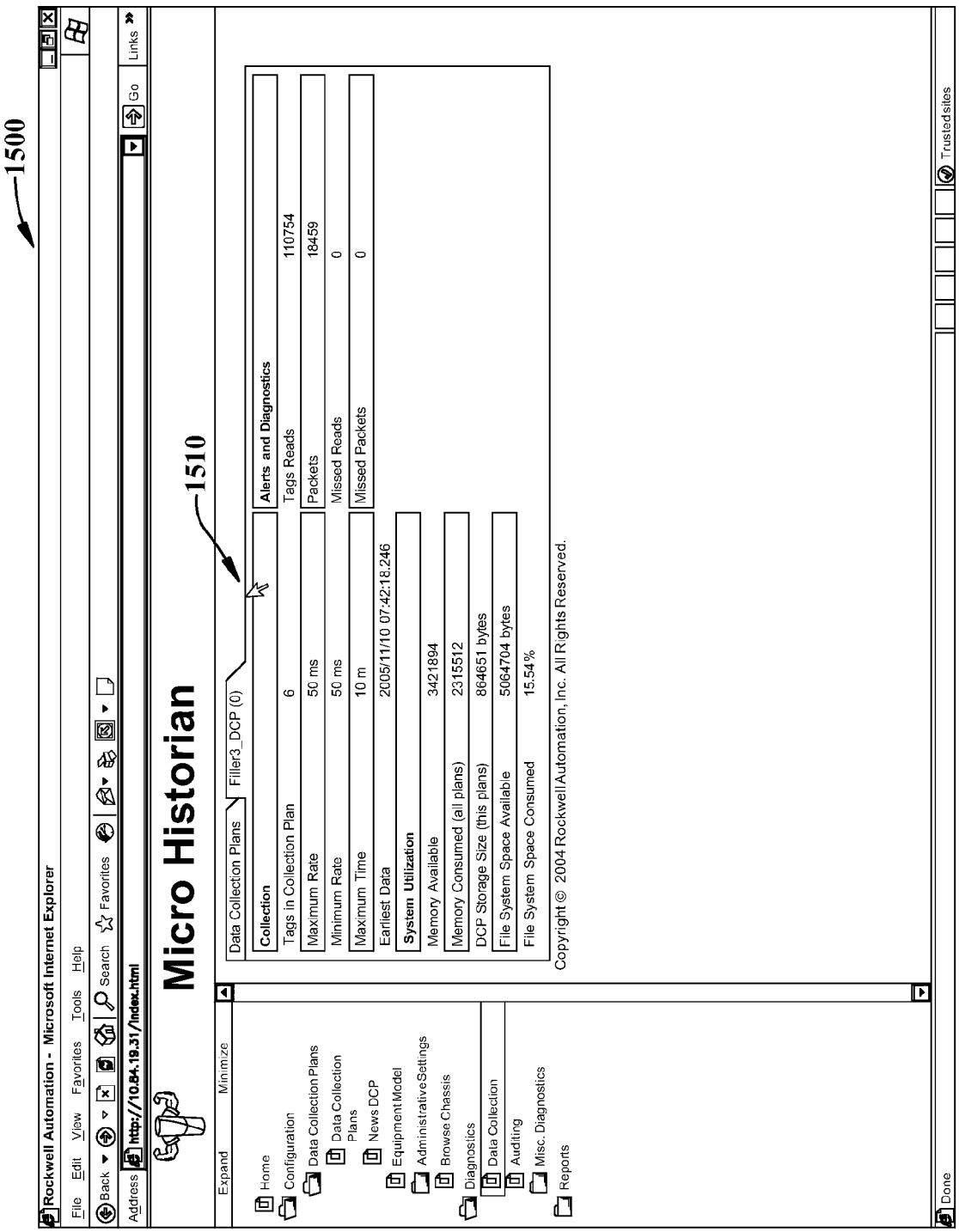
Figure 16:
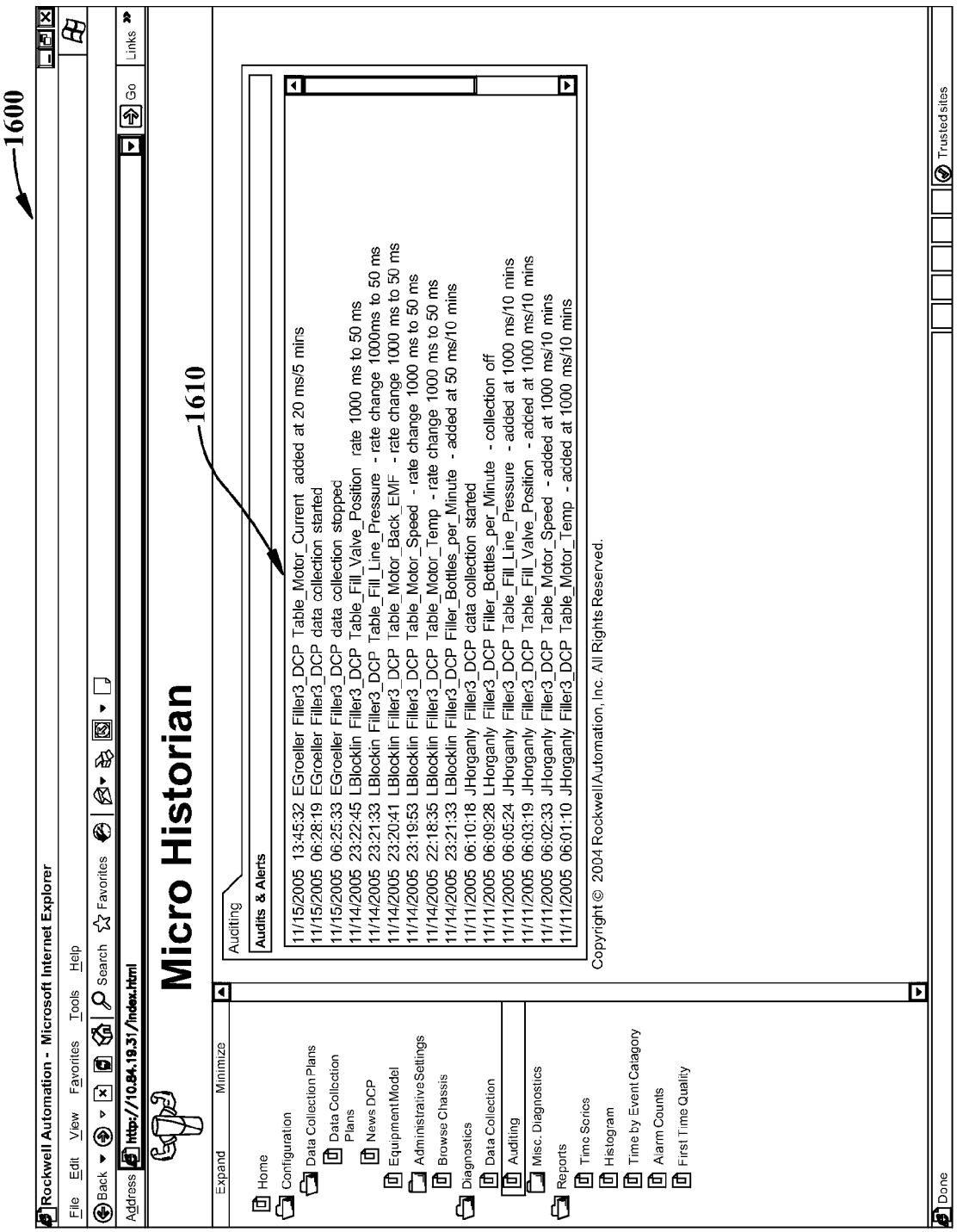

FIG. 15 illustrates an example data collection diagnostics interface 1500. This includes a section 1510 that monitors statistics on various data categories that includes collection status, system utilization, and alerts and diagnostics. Collection stats include number of tags in the collection plan, maximum rates, maximum collection times, earliest data collected and so forth. System utilization includes memory available, memory consumed, collection plan storage size, file system space available, and file system space consumed. Alerts and diagnostics include entries for the number of tag reads, number of data packets read, number of missed reads, and the number of missed packets. As can be appreciated, various other such data items can be provided. FIG. 16 is an interface 1600 that shows time-stamped events relating to various data audits and alerts at 1610. Such example items in the display at 1610 include motor current data, when data collections were stopped and started, valve pressure data, other motor data, assembly line data and so forth.

Figure 17:
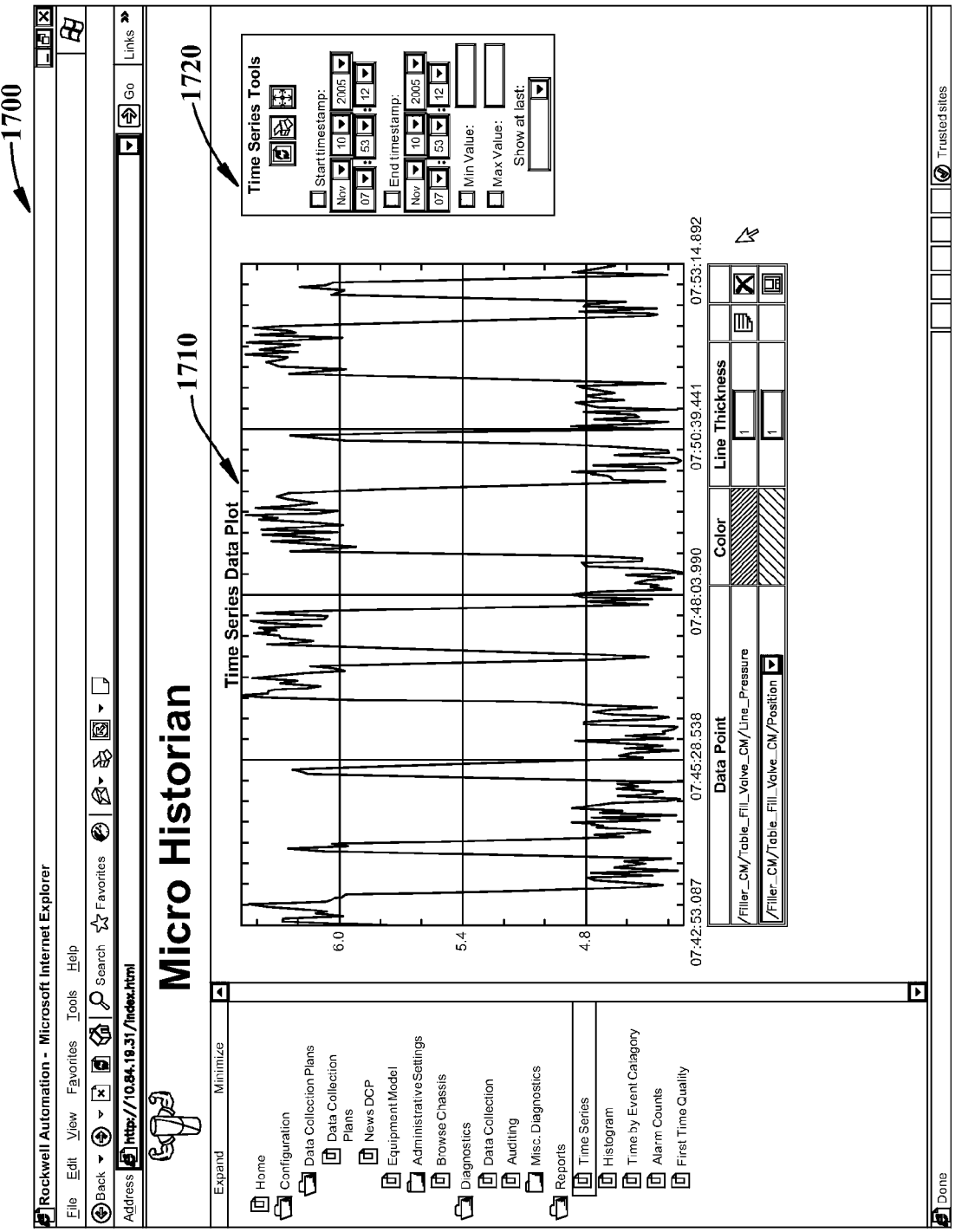
Figure 18:
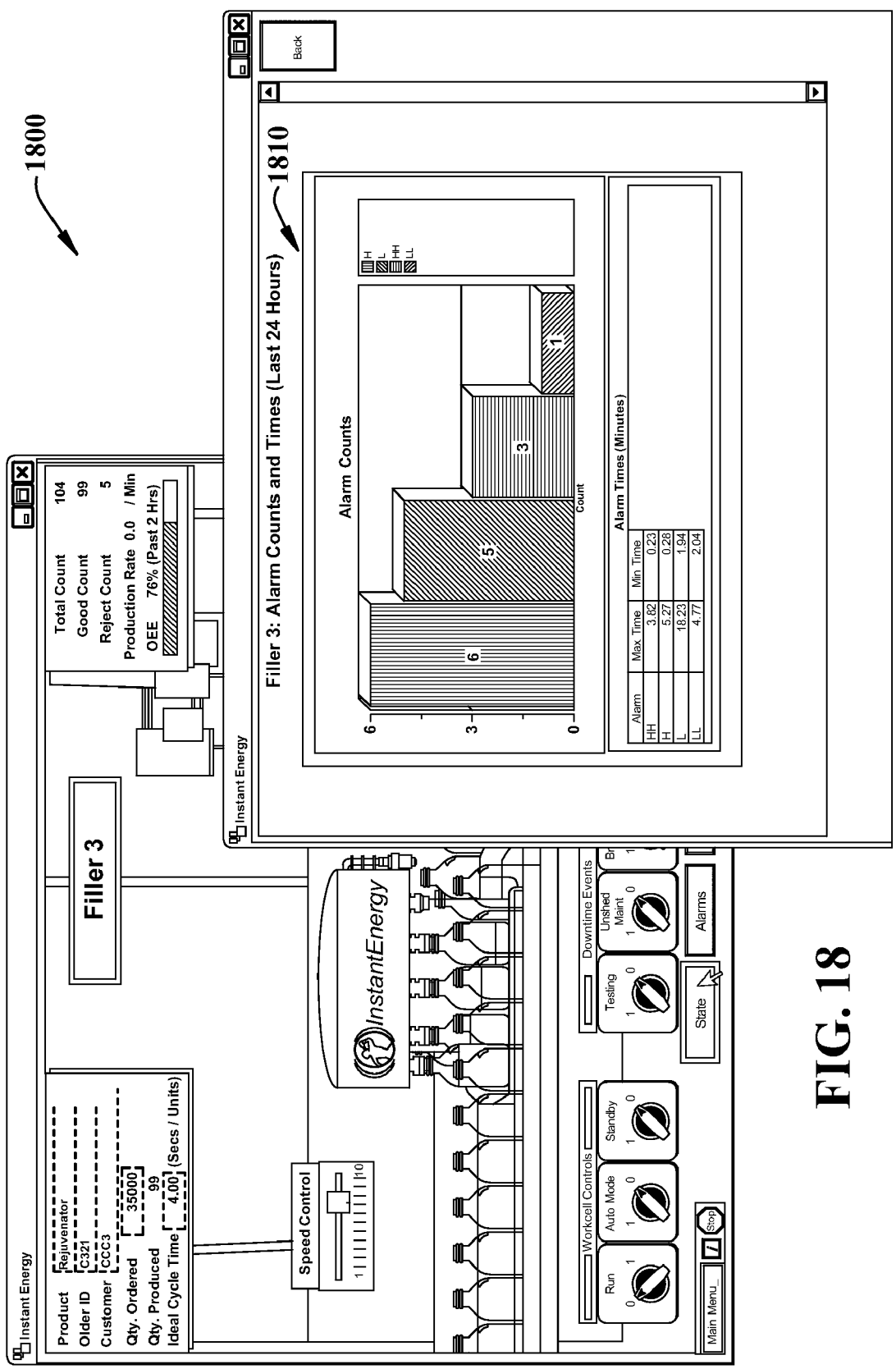

FIG. 17 illustrates an interface 1700 that displays time series data. At 1710 a times series data plot is illustrated. Such data can be viewed as data changes over time. In this example, data representing a valve position is illustrated. At 1720 time series tools are provided to enable starting and stopping of time series data and for setting minimum or maximum values that define alarm or other event conditions for the respective data. FIG. 18 illustrates a display 1800 that illustrates a graphic of alarm counts that have occurred over the last 24 hours.

Figure 19:
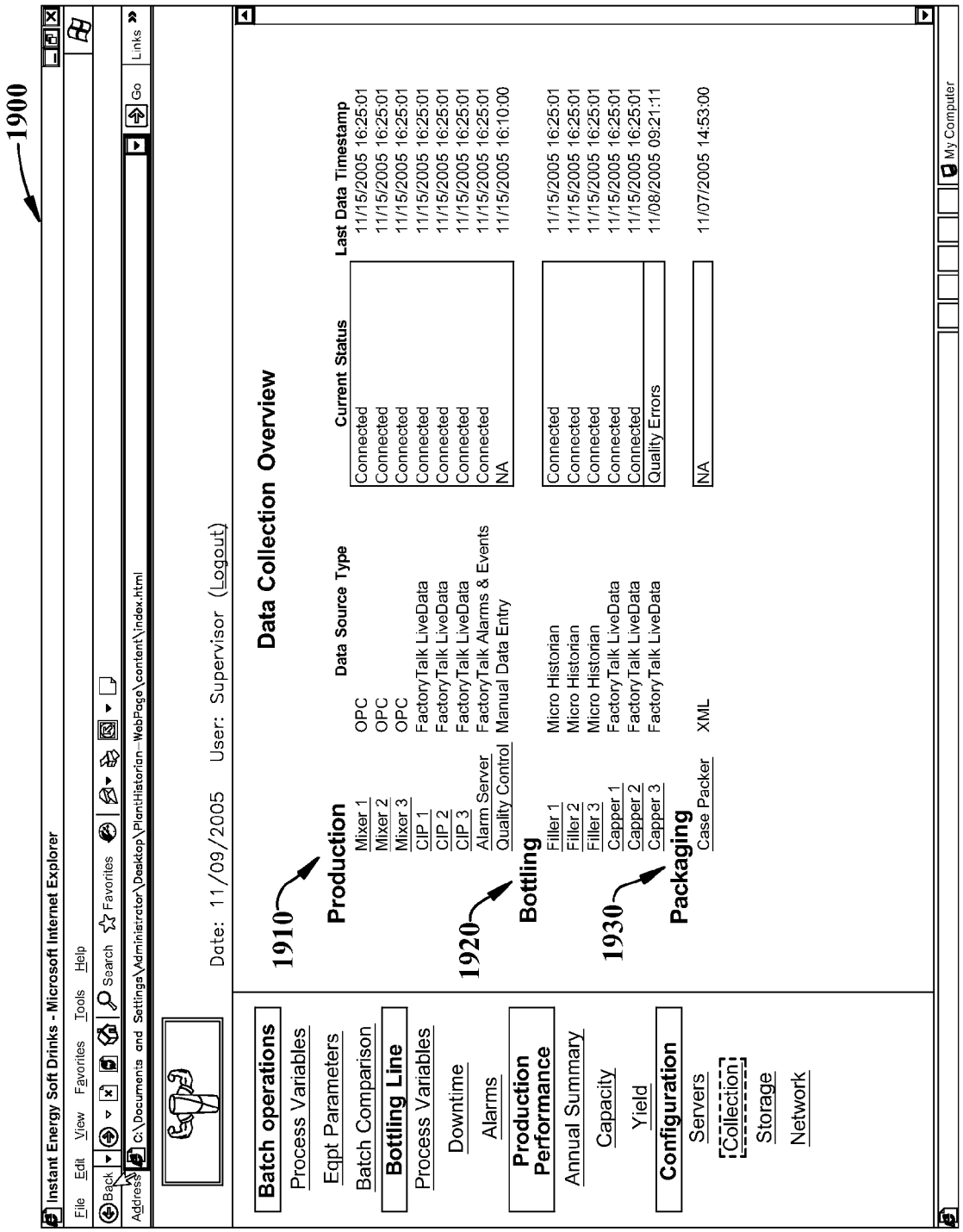
FIGS. 19-25 illustrate example middle tier or plant historian interfaces.
Figure 20:
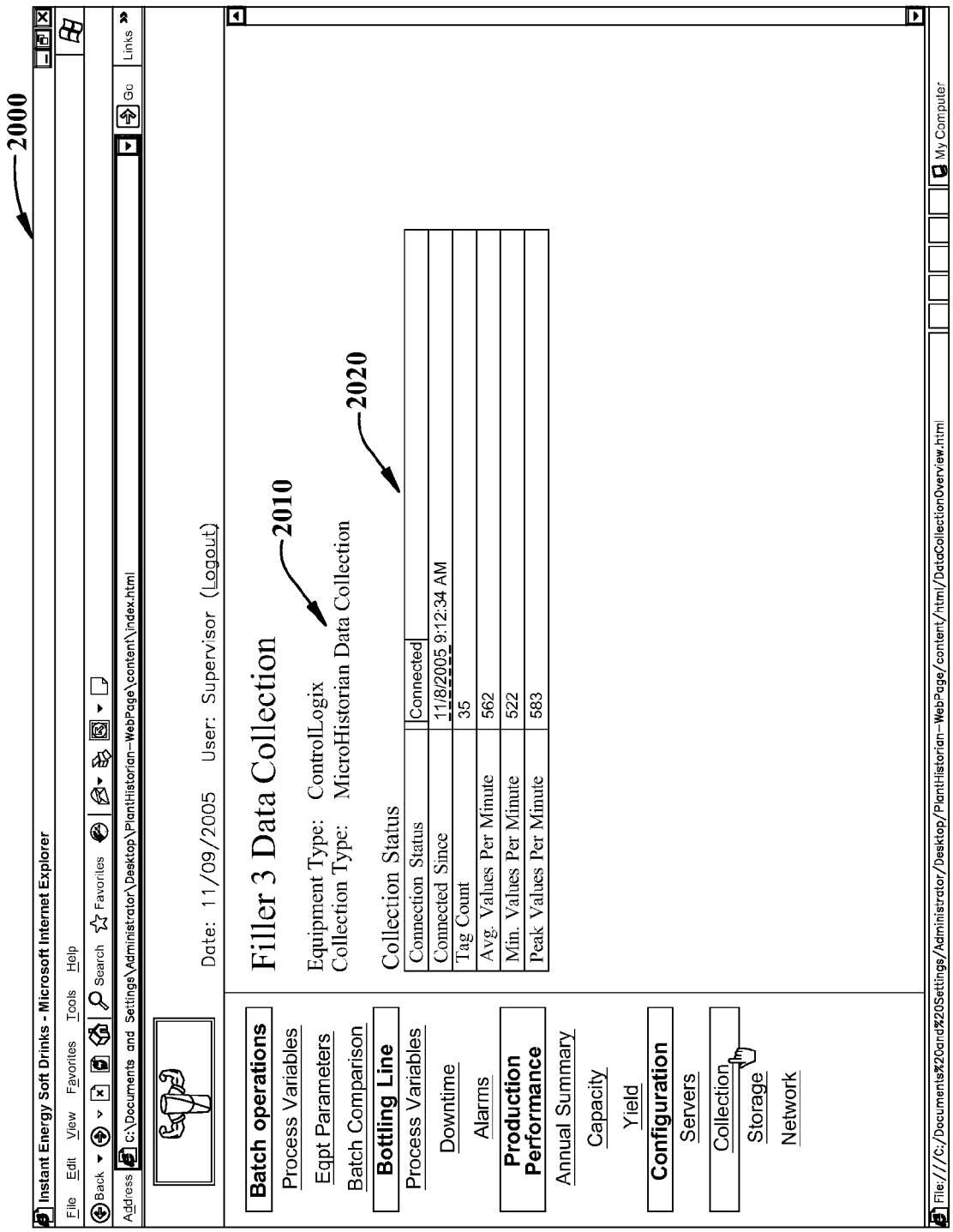

Proceeding to FIGS. 19-25, various plant historian interfaces are illustrated. FIG. 19 illustrates an interface 1900 that displays a data collection overview for a respective plan being monitored. In this example, data is collected from three areas including production 1910, bottling 1920, and packaging 1930. Example components from these areas include mixers, alarm data, quality data, filler data, capper data, and packaging data. Status shown on the display 1900 includes data source type, current data status, and last timestamp recorded. FIG. 20 is a display 2000 that shows data collected from a micro historian at a lower level in the hierarchy. At 2010, an equipment type is shown along with a collection type indicating this data is from a micro historian. At 2020, data collection status is provided including connection status, tag counts, average data values, maximum data values, and minimum data values.

Figure 21:
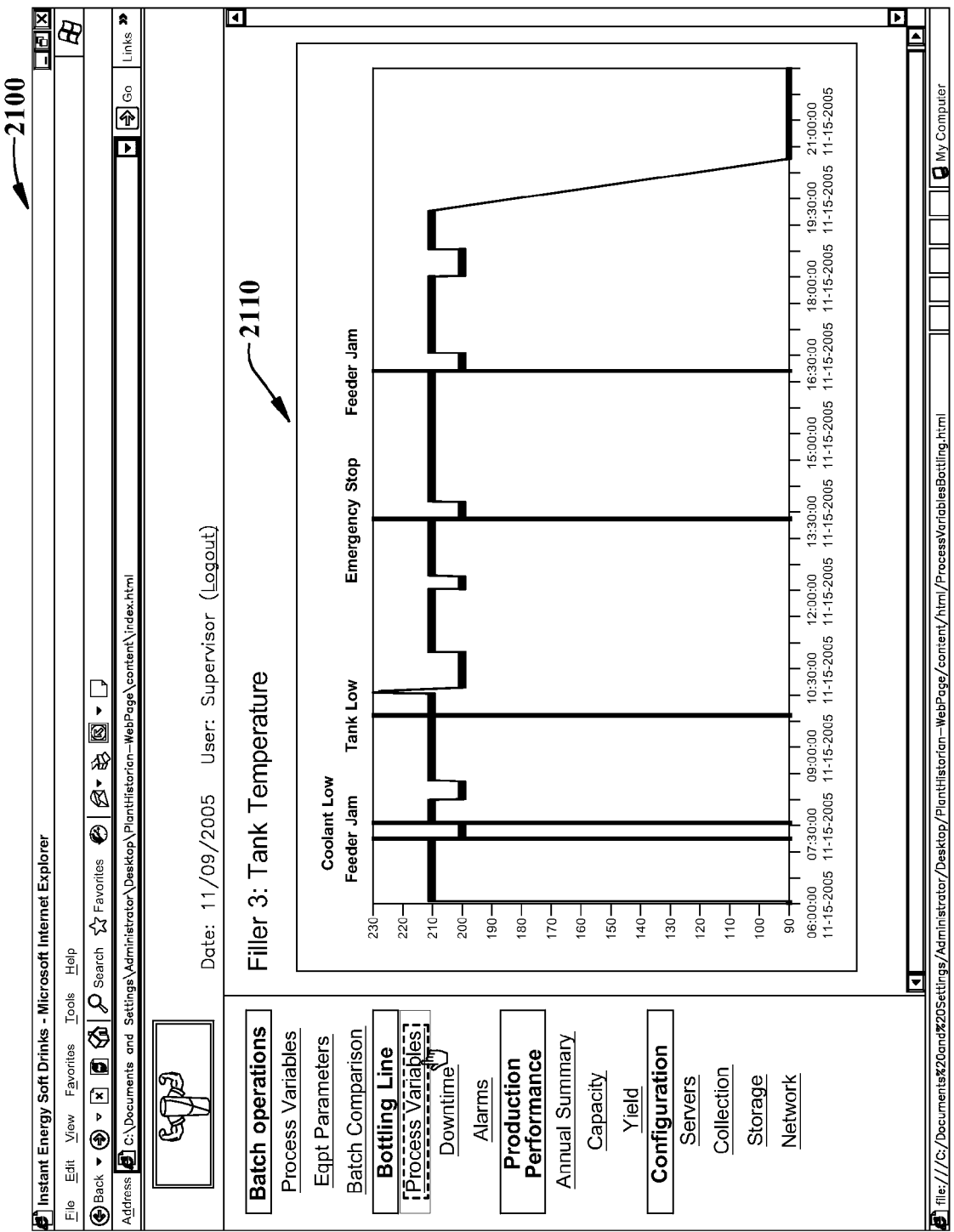
Figure 22:
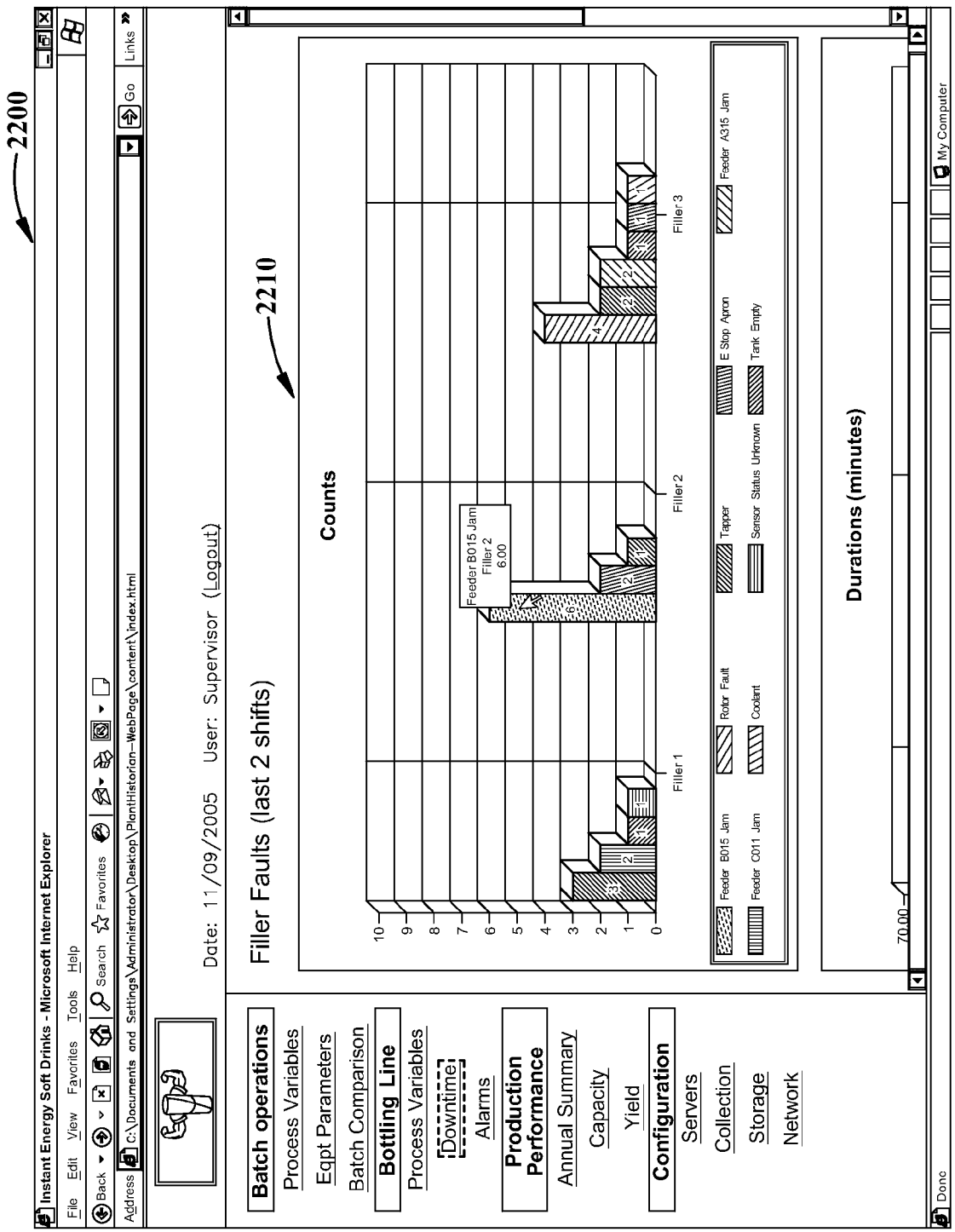
Figure 23:
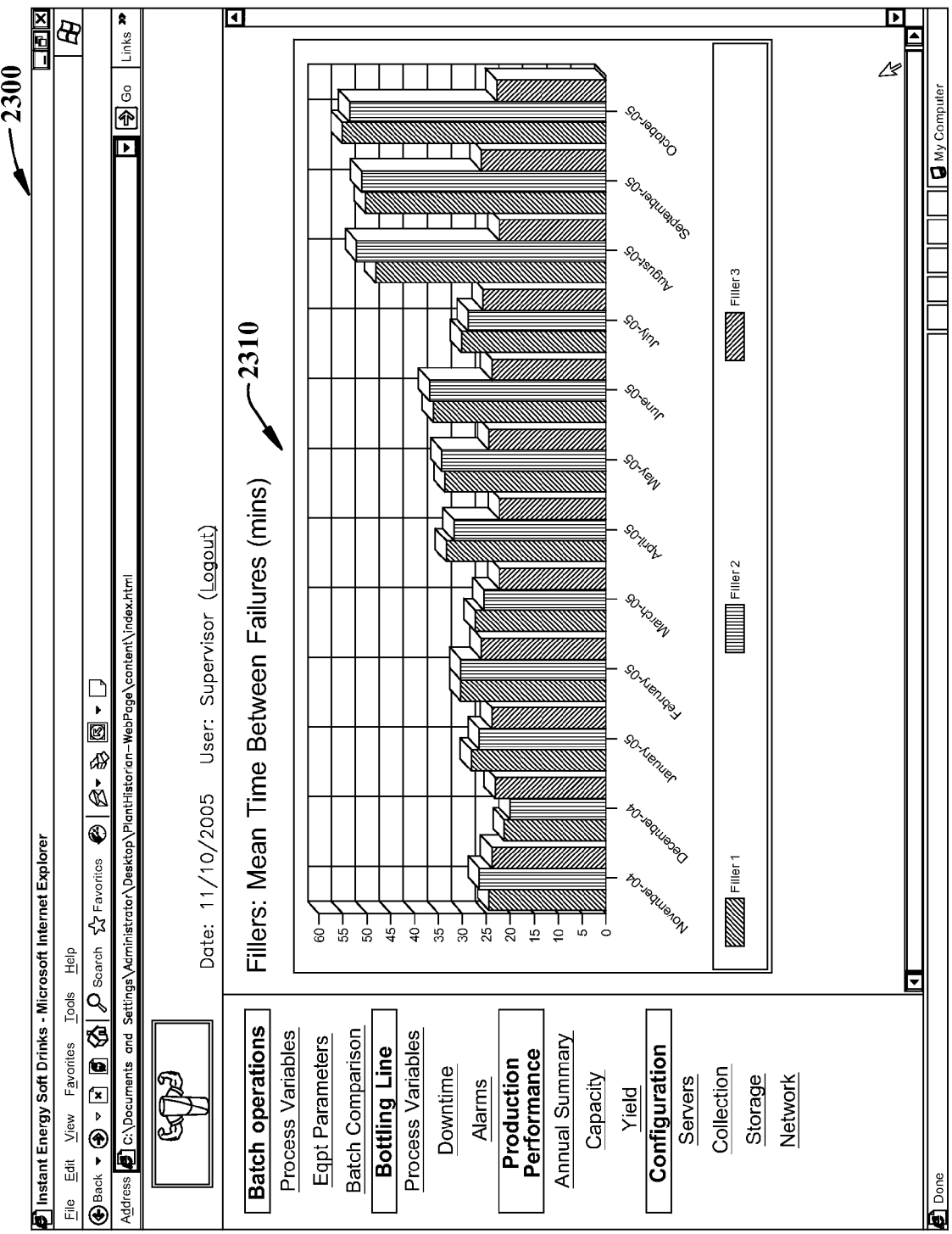
Figure 24:
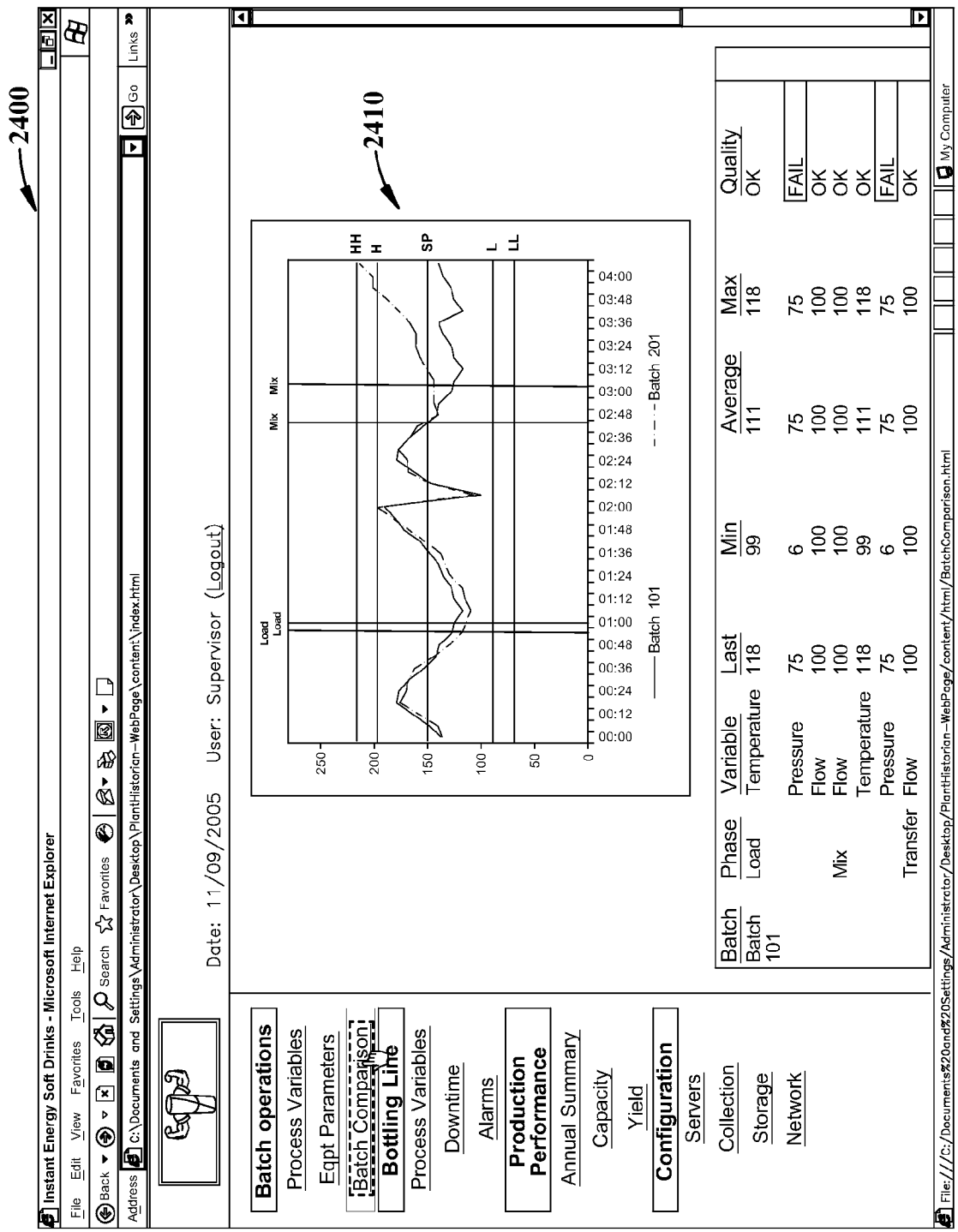
Figure 25:
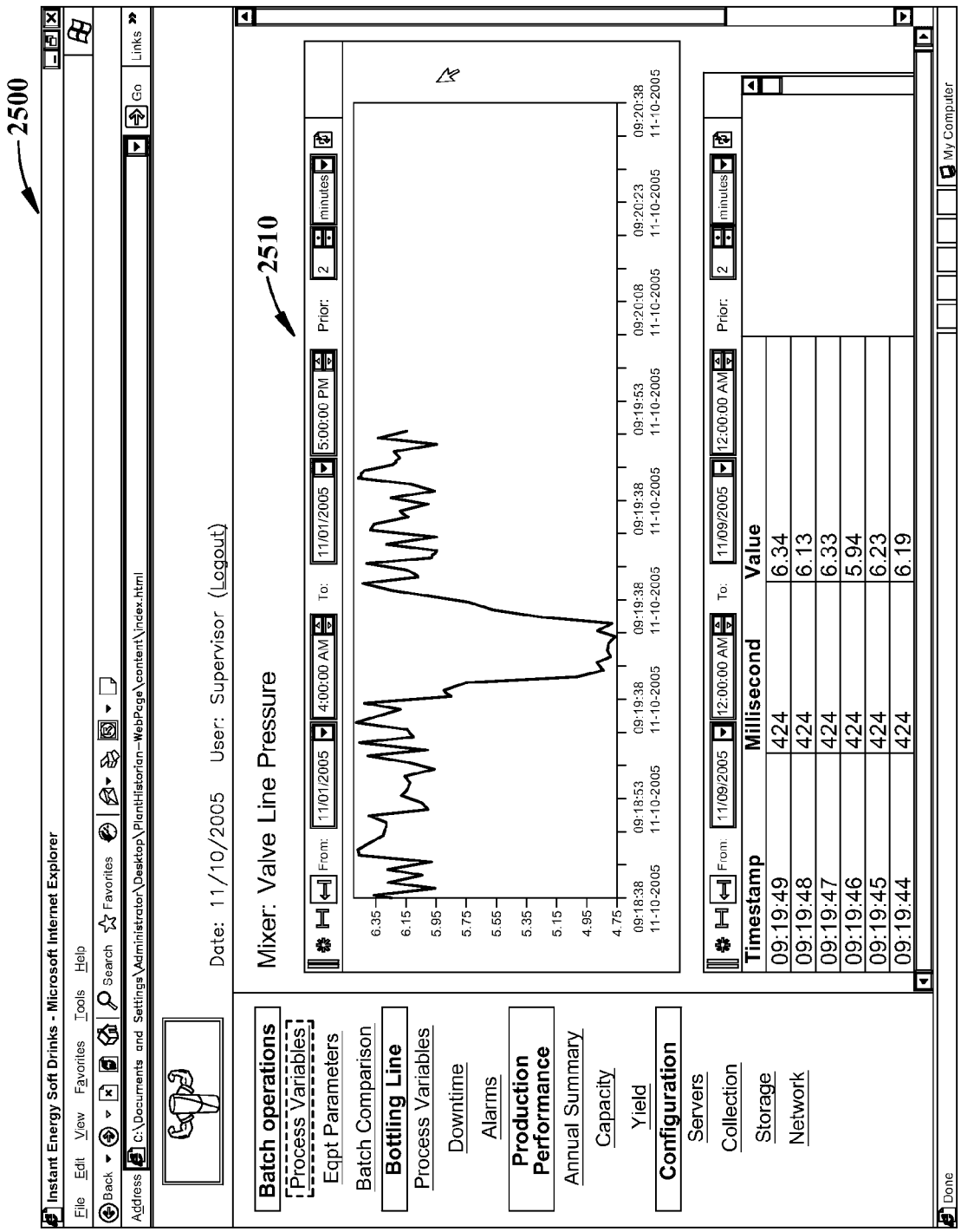

FIG. 21 shows an interface 2100 that depicts alarm and event data happenings over time at 2110. The interface 2100 includes "blending" of time series data and event data on the same display or screen. This allows one to view data over different "lenses" or overlays. In this example, feeder jam events, tank low events, and emergency stop events are displayed. FIG. 22 illustrates a display 2200 that shows downtime histories for three different filler machines at 2210. As can be appreciated, substantially any equipment or data point can be monitored for such down time or other fault. In this case, downtime is a function of counts detected for a particular filler machine. FIG. 23 is an interface 2300 that show trend data for a longer period. In this case, mean time between failure data (MTBF) for three different filler machines is illustrated at 2310. FIG. 24 is an interface 2400 that shows batch comparison data at 2410. In this example, comparisons are shown between two respective batches but it is to be appreciated that more than two comparisons can be computed and displayed. FIG. 25 illustrates data that has been buffered or stored at a controller level and then subsequently processed and displayed at the plant historian level at 2510. This example shows valve line pressure that had been captured and saved at the controller level and then forwarded to the plant historian level.

Figure 26:
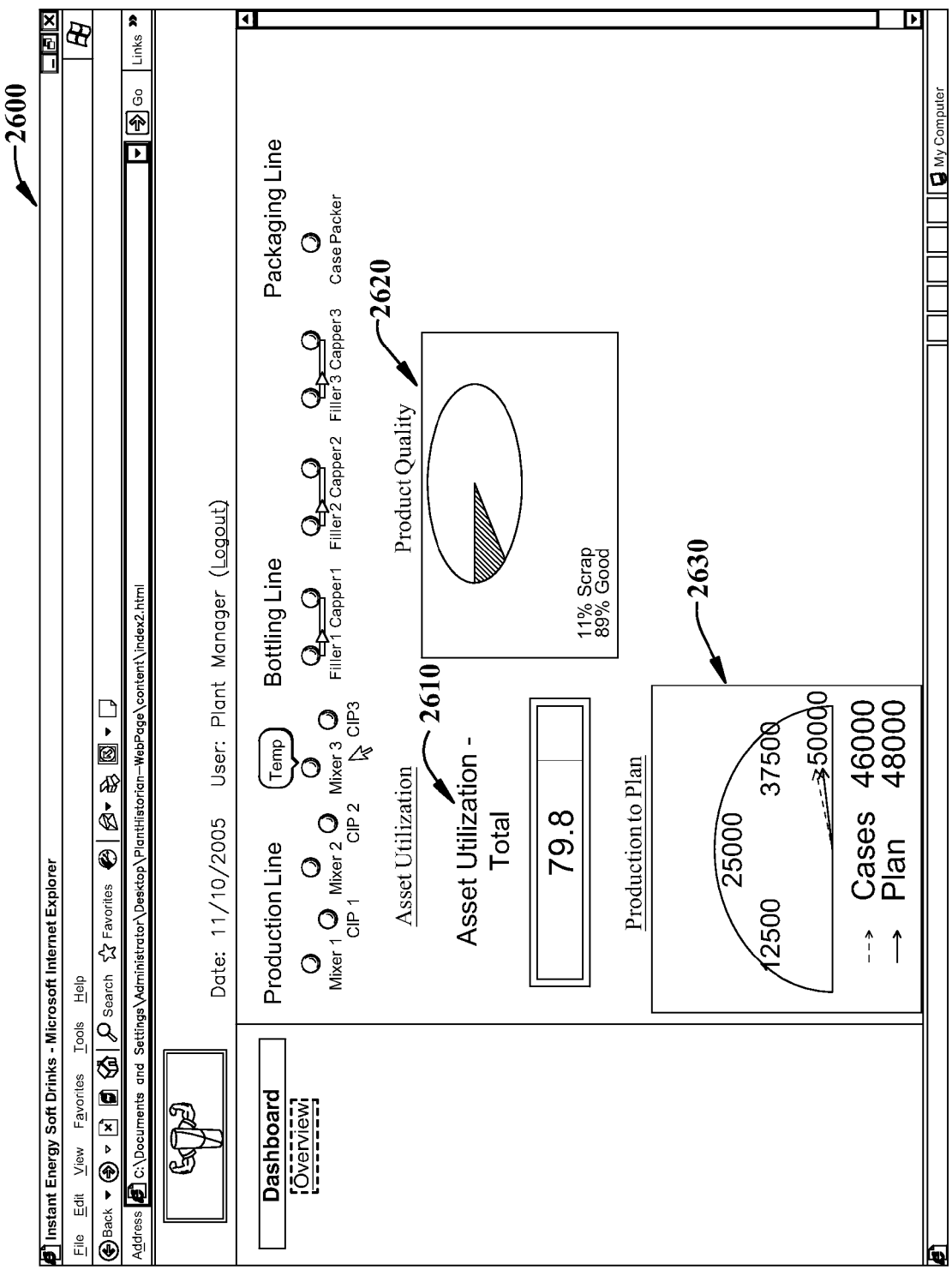
FIGS. 26 and 27 illustrate example upper tier or enterprise historian interfaces.
Figure 27:
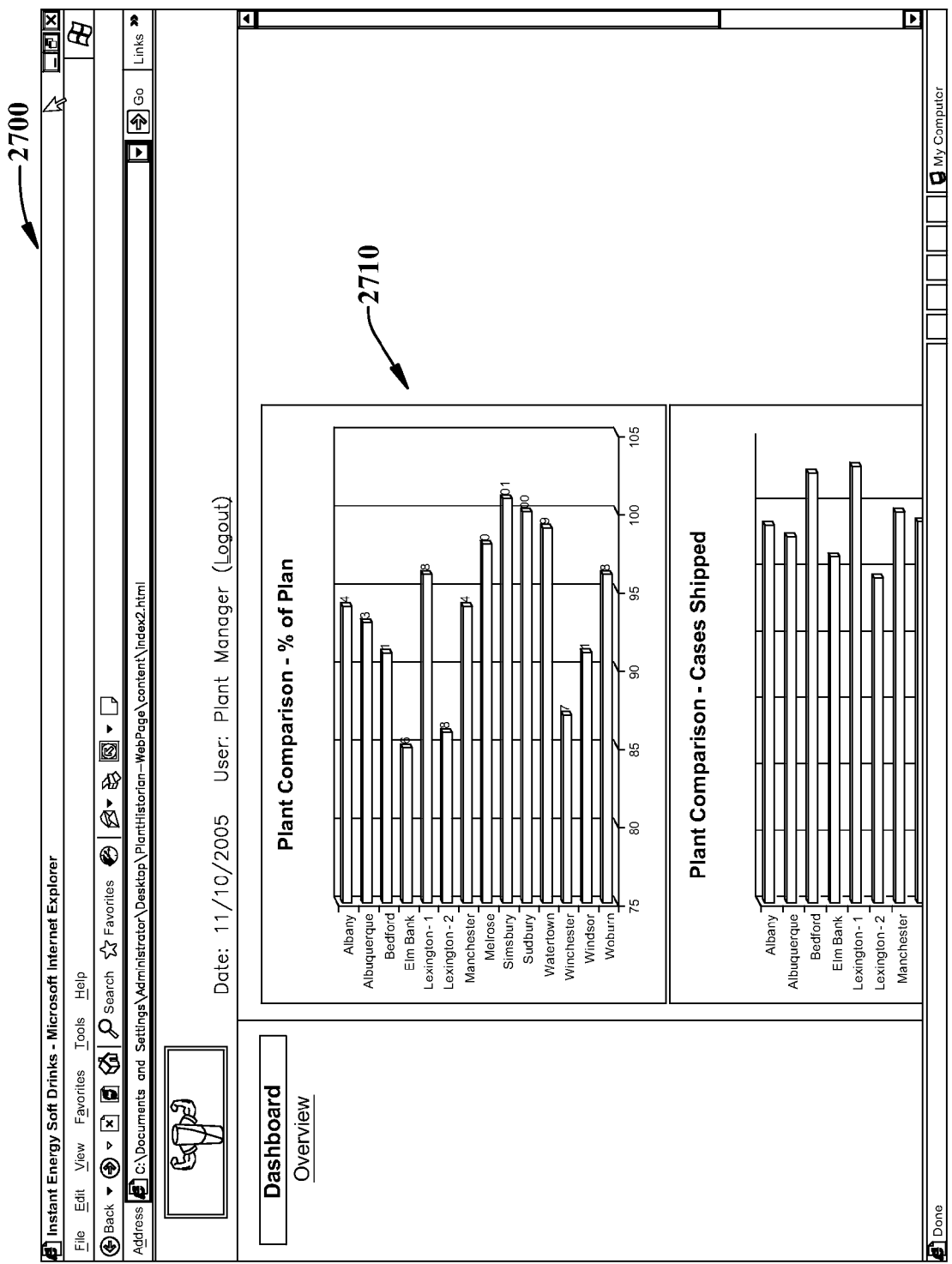

FIGS. 26 and 27 illustrate data that has been collected at an enterprise level of an organization which is above the plant and micro historians described previously. FIG. 26 shows an interface 26 that collects data from three separate lines including production, bottling, and packaging. Asset utilization is shown at 2610, where a product quality pie chart is shown at 2620. A production to plan chart is shown at 2630. FIG. 27 is an interface 2700 that shows plant to plant data comparisons between different geographical locations at 2710.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   one or more processors;
   at least one memory communicatively coupled to the one or more processors, the memory having stored therein computer-executable instructions configured to implement the industrial automation system, including:
      a plurality of historian components residing at multiple hierarchical levels of an organization that collect information across the multiple hierarchical levels, wherein information collection functionality performed by a first historian component of the plurality of historian components at a first hierarchical level is shifted to a second historian component of the plurality of historian components on a disparate hierarchical level if information collection resources at the first hierarchical level are determined to be overloaded, wherein at least two of the hierarchical levels comprise a control level and a second level, the second level being a higher level of the organizational hierarchy than the control level;
      a user interface comprising at least one display object to display data associated with the plurality of historian components; and
      a common data model that manages the information across the multiple hierarchical levels of the organization, wherein the common data model enables the plurality of historian components to expose their respective functionality to other components in the system.

2. The industrial automation system of claim 1, the user interface further comprising a first field that includes a plurality of selectable or expandable entities and a second field that includes data relating to a selected entity.

3. The industrial automation system of claim 2, the first field includes a folder that relates to data collection plans where expansion of the folder reveals an icon that relates to an equipment model.

4. The industrial automation system of claim 2, the second field provides a hierarchical view of an equipment model.

5. The industrial automation system of claim 3, the second field includes an option to add at least one of a new control module or a new data point to a data collection plan and includes a plurality of tabs, wherein selection of one of the plurality of tabs enables provision of plant related data or options.

6. The industrial automation system of claim 5, the user interface further comprising one or more objects allowing a data collection plan to be viewed and configured, the one or more objects facilitating configuration of a data collection rate, an event, and a data collection duration time for the data collection plan.

7. The industrial automation system of claim 6, the user interface further comprising an object that provides a summary of the data collection plan.

8. The industrial automation system of claim 1, the user interface further comprising an object to display and manipulate diagnostic information associated with the plurality of historian components.

9. The industrial automation system of claim 1, the user interface further comprising an object to display and manipulate audit information associated with the plurality of historian components.

10. The industrial automation system of claim 1, the user interface further comprising an object to display and manipulate at least one of alarm or event information associated with the plurality of historian components, where contextual display of event information is overlaid with process data.

11. The industrial automation system of claim 1, the user interface further comprising an object for at least one of reading or generating a report associated with the plurality of historian components.

12. The industrial automation system of claim 11, the user interface further comprising at least one of a time series icon, a histogram icon, an alarm counts icon, or an events icon.

13. The industrial automation system of claim 12, the user interface further comprising an object that displays a graphical analysis of time-series data, where visual characteristics of the graph are configurable per user request.

14. The industrial automation system of claim 13, the user interface further comprising a plurality of time-series tools that include a start and stop time-stamping component.

15. The industrial automation system of claim 1, the user interface further comprising a first component that displays collection data relating to an entirety of a plant and a second component that displays collection data relating to a type of process.

16. The industrial automation system of claim 1, the user interface further comprising a configuration component for a historian application.

17. The industrial automation system of claim 16, the user interface further comprising a field that displays information relating to the historian application, the information including at least one of a connection summary, a duration of a connection, a number of tags or data points associated with the historian application, or data values collected over time.

18. The industrial automation system of claim 1, the user interface further comprising graphical depictions of at least one of alarm sequences, mean time between failures, faults associated with particular shifts, or an alarm summary.

19. The industrial automation system of claim 1, wherein the user interface facilitates embedding at least one micro historian component within a device at the control level of the organization and configuring the at least one micro historian to collect data at the control level.

20. The industrial automation system of claim 19, wherein the user interface facilitates configuration of a plant level of the organization to aggregate the data collected by the at least one micro historian at the plant level, the plant level being higher than the control layer.

21. A computer-readable storage medium having computer-executable components stored thereon, comprising:
   at least one data historian residing on a first hierarchical level of an organization that collects data from the first hierarchical level, the at least one data historian configured to shift data collection functionality to a disparate data historian residing on a second hierarchical level if data collection resources on the first hierarchical level are determined to be overloaded, wherein the first hierarchical level comprises a control level and the second hierarchical level is a higher level of the organizational hierarchy than the control level;
   at least a first field to display components of the at least one data historian;
   at least a second field to configure the at least one data historian to collect data from at least one of the first hierarchical level or the second hierarchical level; and
   a common data model that exposes data associated with the at least one data historian to a disparate data historian.

22. The computer-readable storage medium of claim 21, the data structure further comprising:

at least a third field that allows at least one micro historian to be embedded within a device residing at the control level of the organization and to be configured to collect data at the control level; and at least a fourth field that allows an enterprise component to be configured to aggregate the data collected by the at least one micro historian at a level of the organization higher than the control level.

23. An industrial data collection system, comprising:

one or more processors, at least one memory communicatively coupled to the one or more processors, the at least one memory having stored therein computer-executable instructions configured to implement the data collection system, including:
- at least one micro historian component residing on a control level of an organizational hierarchy that collects data from the control level;
- at least one second historian component that resides on a second level of the organizational hierarchy, the second level being a higher level of the organizational hierarchy than the control level, wherein data collection functionality is shifted from the at least one micro historian component to the at least one second historian component if it is determined that the at least one micro historian component's data collection resources are overloaded;
- a first set of user interface screens that display data relating to the at least one micro historian component, at least one of the first set of user interface screens allowing configuration of the at least one micro historian component; and
- a second set of user interface screens that display data relating to the at least one second historian component.

24. The industrial data collection system of claim 23, further comprising:

a third set of user interface screens that display data relating to at least one enterprise historian component that aggregates data from at least one of the control level or the second level of the organizational hierarchy.

* * * * *